United States Patent
Kwon et al.

(10) Patent No.: US 11,236,544 B2
(45) Date of Patent: Feb. 1, 2022

(54) SMART WINDOW, SLIDING SMART WINDOW, SMART WINDOW FOR VEHICLE, SUN VISOR FOR VEHICLE, SMART WINDOW DEVICE, AND HEAD MOUNTED SMART WINDOW DEVICE

(71) Applicant: NDIS CORPORATION, Asan-si (KR)

(72) Inventors: Soon Bum Kwon, Asan-si (KR); Burm Young Lee, Cheonan-si (KR); Hee Sang Yoo, Asan-si (KR); Da Som Yoon, Asan-si (KR)

(73) Assignee: NDIS CORPORATION, Asan-si (KR)

( * ) Notice: Subject to any disclaimer, the term of this patent is extended or adjusted under 35 U.S.C. 154(b) by 0 days.

(21) Appl. No.: 16/960,276

(22) PCT Filed: Jan. 7, 2019

(86) PCT No.: PCT/KR2019/000214
§ 371 (c)(1),
(2) Date: Jul. 6, 2020

(87) PCT Pub. No.: WO2019/135653
PCT Pub. Date: Jul. 11, 2019

(65) Prior Publication Data
US 2021/0071473 A1 Mar. 11, 2021

(30) Foreign Application Priority Data
Jan. 5, 2018 (KR) .................. 10-2018-0001760

(51) Int. Cl.
*E06B 9/24* (2006.01)
*A42B 3/04* (2006.01)
*B60J 3/02* (2006.01)
*B60J 3/04* (2006.01)
*B60J 3/06* (2006.01)
(Continued)

(52) U.S. Cl.
CPC ............ *E06B 9/24* (2013.01); *A42B 3/042* (2013.01); *B60J 3/0204* (2013.01); *B60J 3/04* (2013.01); *B60J 3/06* (2013.01); *E06B 3/6722* (2013.01); *G02F 1/1393* (2013.01); *G02F 1/13318* (2013.01); *G02F 1/13363* (2013.01); *G02F 1/13439* (2013.01); *G02F 1/133308* (2013.01); *G02F 1/133528* (2013.01); *G02F 1/133784* (2013.01); *E06B 2009/2417* (2013.01);
(Continued)

(58) Field of Classification Search
None
See application file for complete search history.

(56) References Cited

U.S. PATENT DOCUMENTS

2018/0373068 A1\* 12/2018 Lim .................... G02F 1/13743

FOREIGN PATENT DOCUMENTS

| JP | 07-333612 A | 12/1995 |
|----|-------------|---------|
| JP | 5458218 B1  | 4/2014  |

(Continued)

OTHER PUBLICATIONS

Translation of JP 2014-202942A (Year: 2014).\*

*Primary Examiner* — Phu Vu
(74) *Attorney, Agent, or Firm* — Novick, Kim & Lee, PLLC; Sang Ho Lee; Hyun Woo Shin

(57) ABSTRACT

Provided are a smart window, a sliding smart window, a smart window for a vehicle, a sun visor for a vehicle, a smart window device, and a head-mounted smart window device which have maximized user convenience.

15 Claims, 24 Drawing Sheets

(51) Int. Cl.
*E06B 3/67* (2006.01)
*G02F 1/133* (2006.01)
*G02F 1/1333* (2006.01)
*G02F 1/1335* (2006.01)
*G02F 1/13363* (2006.01)
*G02F 1/1337* (2006.01)
*G02F 1/1343* (2006.01)
*G02F 1/139* (2006.01)

(52) U.S. Cl.
CPC .. *E06B 2009/2464* (2013.01); *G02F 1/13312* (2021.01); *G02F 1/133531* (2021.01)

(56) References Cited

FOREIGN PATENT DOCUMENTS

| | | | |
|---|---|---|---|
| JP | 2014-202942 A | 10/2014 |
| KR | 10-2009-0005009 A | 1/2009 |
| KR | 10-2017-0081339 A | 7/2017 |
| WO | 2014/087447 A1 | 6/2014 |

* cited by examiner

SMART WINDOW, SLIDING SMART WINDOW, SMART WINDOW FOR VEHICLE, SUN VISOR FOR VEHICLE, SMART WINDOW DEVICE, AND HEAD MOUNTED SMART WINDOW DEVICE

TECHNICAL FIELD

The present disclosure relates to a smart window, a sliding smart window, a smart window for a vehicle, a sun visor for a vehicle, a smart window device, and a head-mounted smart window device, and more particularly, to a smart window, a sliding smart window, a smart window for a vehicle, a sun visor for a vehicle, a smart window device, and a head-mounted smart window device which have maximized user convenience.

BACKGROUND ART

Windows are often coated with external light blocking coatings to reduce transmittance of direct sunlight or the like irradiated from the outside. Existing windows have fixed transmittances, and external light blocking coatings also have fixed transmittances. Therefore, in an existing case, the total transmittance is fixed by a window and an external light blocking coating.

DESCRIPTION OF EMBODIMENTS

Technical Problem

However, in such an existing window, the total transmittance is fixed, and thus, inconvenience may occur according to the environment. For example, when the total transmittance is set low, there is no trouble in daytime when there is the enough amount of light in the surroundings. However, in the case of morning or night when there is not the enough amount of light in the surroundings, it is inevitable to have difficulty in properly checking the surroundings. Alternatively, when the total transmittance is set high, glare may occur in daytime when there is the enough amount of light in the surroundings.

Solution to Problem

Provided are a smart window, a sliding smart window, a smart window for a vehicle, a sun visor for a vehicle, a smart window device, and a head-mounted smart window which have maximized user convenience. However, these problems are examples, and the scope of the present disclosure is not limited by these problems.

According to an aspect of the present disclosure, a smart window may include: a first substrate to be located in an indoor direction and a second substrate to be located in an outdoor direction, the first substrate and the second substrate being transparent and facing each other; a first electrode which is transparent and a first alignment layer which is rubbed in a first direction, the first electrode and the first alignment layer being sequentially disposed over a surface of the first substrate facing the second substrate; a second electrode which is transparent and a second alignment layer which is rubbed in a second direction different from the first direction, the second electrode and the second alignment layer being sequentially disposed over a surface of the second substrate facing the first substrate; and a liquid crystal layer located between the first alignment layer and the second alignment layer, wherein, when a potential difference applied between the first electrode and the second electrode is V, a transmittance of light incident from the outside into a room in a first incident direction perpendicular to the second substrate is referred to as a vertical transmittance, and a transmittance of light incident from the outside into the room in a second incident direction not perpendicular to the second substrate is referred to as a first inclined transmittance, the first inclined transmittance is less than the vertical transmittance when V is not 0, and a difference between the vertical transmittance and the first inclined transmittance when V is not 0 is greater than a difference between the vertical transmittance and the first inclined transmittance when V is 0.

Advantageous Effects of Disclosure

According to an embodiment of the present disclosure as described above, embodied may be a smart window, a sliding smart window, a smart window for a vehicle, a sun visor for a vehicle, a smart window device, and a head-mounted smart window device which have maximized user convenience. The scope of the present disclosure is not limited by these effects.

BEST MODE

Figure 1:
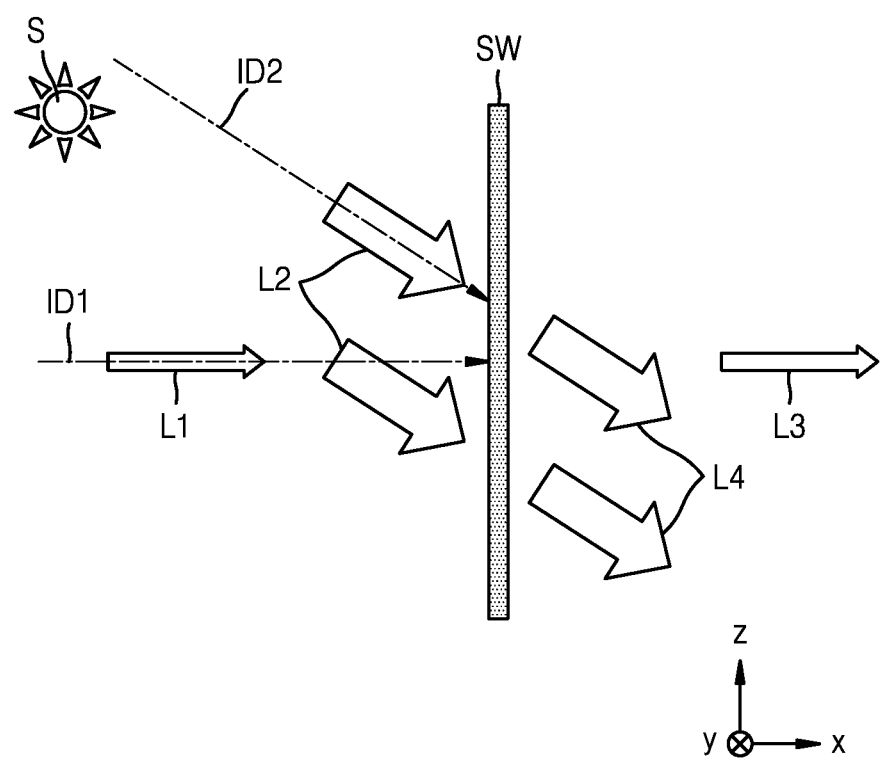
FIGS. 1 and 2 are conceptual views schematically illustrating an operation principle of a smart window according to an embodiment of the present disclosure.

According to an aspect of the present disclosure, a smart window may include: a first substrate to be located in an indoor direction and a second substrate to be located in an outdoor direction, the first substrate and the second substrate being transparent and facing each other; a first electrode which is transparent and a first alignment layer which is rubbed in a first direction, the first electrode and the first alignment layer being sequentially disposed over a surface of the first substrate facing the second substrate; a second electrode which is transparent and a second alignment layer which is rubbed in a second direction different from the first direction, the second electrode and the second alignment layer being sequentially disposed over a surface of the second substrate facing the first substrate; and a liquid crystal layer located between the first alignment layer and the second alignment layer, wherein, when a potential difference applied between the first electrode and the second electrode is V, a transmittance of light incident from the outside into a room in a first incident direction perpendicular to the second substrate is referred to as a vertical transmittance, and a transmittance of light incident from the outside into the room in a second incident direction not perpendicular to the second substrate is referred to as a first inclined transmittance, the first inclined transmittance is less than the vertical transmittance when V is not 0, and a difference between the vertical transmittance and the first inclined transmittance when V is not 0 is greater than a difference between the vertical transmittance and the first inclined transmittance when V is 0.

When a transmittance of light incident from the outside into the room in a third incident direction symmetrical to the second incident direction with respect to the first incident direction within a virtual plane including the first incident direction and the second incident direction is a second inclined transmittance, the first inclined transmittance is less than the second inclined transmittance when V is not 0. The second inclined transmittance is may be greater than the vertical transmittance.

The smart window may further include: a first polarizing plate disposed over a surface of the first substrate facing away the second substrate; and a second polarizing plate disposed over a surface of the second substrate facing away the first substrate, wherein the liquid crystal layer operates in an electrically controlled birefringence (ECB) mode, the first direction and the second direction are parallel to a virtual straight line on which a virtual plane including the first incident direction and the second incident direction intersects with a surface of the second substrate in an outdoor direction, a transmission axis of the first polarizing plate is at an angle of 45° with the virtual straight line, and a transmission axis of the second polarizing plate is perpendicular to the transmission axis of the first polarizing plate.

When the second incident direction is expressed as a sum of a first sub-direction perpendicular to the second substrate and a second sub-direction parallel to the second substrate, the second direction may coincide with the second sub-direction.

The smart window may further include: a first polarizing plate disposed over a surface of the first substrate facing away the second substrate; a second polarizing plate disposed over a surface of the second substrate facing away the first substrate; and a phase difference plate disposed over the surface of the first substrate facing away the second substrate or on the surface of the second substrate facing away the first substrate, wherein the liquid crystal operates in a vertical alignment (VA) mode, the first direction and the second direction are parallel to a virtual straight line on which a virtual plane including the first incident direction and the second incident direction intersects with a surface of the second substrate in an outdoor direction, a transmission axis of the first polarizing plate is at an angle of 45° with the virtual straight line, a transmission axis of the second polarizing plate is perpendicular to the transmission axis of the first polarizing plate, and a phase delay axis of the phase difference plate is parallel to the virtual straight line.

When the second incident direction is expressed as a sum of a first sub-direction perpendicular to the second substrate and a second sub-direction parallel to the second substrate, the second direction may coincide with the second sub-direction.

The smart window may further include: a first polarizing plate disposed over a surface of the first substrate facing away the second substrate; a second polarizing plate disposed over a surface of the second substrate facing away the first substrate; and a phase difference plate disposed over the surface of the first substrate facing away the second substrate or on the surface of the second substrate facing away the first substrate, wherein the liquid crystal layer operates in a vertical alignment (VA) mode, the first direction and the second direction are parallel to a virtual straight line on which a virtual plane including the first incident direction and the second incident direction intersects with a surface of the second substrate in an outdoor direction, a transmission axis of the first polarizing plate is at an angle of 45° with the virtual straight line, a transmission axis of the second polarizing plate is perpendicular to the transmission axis of the first polarizing plate, and a phase delay axis of the phase difference plate is perpendicular to the virtual straight line.

When the second incident direction is expressed as a sum of a first sub-direction perpendicular to the second substrate and a second sub-direction parallel to the second substrate, the second direction may coincide with a direction opposite to the second-sub direction.

The smart window may further include: a first polarizing plate disposed over a surface of the first substrate facing away the second substrate; and a second polarizing plate disposed over a surface of the second substrate facing away the first substrate, wherein, the liquid crystal layer operates in a twisted nematic (TN) mode, the first direction is parallel to a surface of the second substrate in an outdoor direction, and is at an angle of 45° with a virtual straight line on which a virtual plane including the first incident direction and the second incident direction intersects with the surface of the second substrate in the outdoor direction, and when the first direction is expressed as a sum of a first auxiliary direction parallel to the virtual straight line and a second auxiliary direction perpendicular to the virtual straight line, and the second incident direction is expressed as a sum of a first sub-direction perpendicular to the second substrate and a second sub-direction parallel to the second substrate, the first auxiliary direction is a direction opposite to the second sub-direction, the second auxiliary direction is a direction rotated clockwise from the first auxiliary direction when looking at the second substrate from the first substrate, and the second direction is a direction rotated 90° clockwise from the first direction when looking at the second substrate from the first substrate, a transmission axis of the first polarizing plate is parallel to the first direction, and a transmission axis of the second polarizing plate is parallel to the second direction.

According to another aspect of the present disclosure, a smart window device may include: one of smart windows as described above; and an incident angle sensing unit recognizing an incident angle of sunlight, wherein an angle between the first incident direction and the second incident direction is adjusted by adjusting a potential difference V applied between the first electrode and the second electrode according to an incident angle of sunlight recognized by the incident angle sensing unit, such that the first inclined transmittance is minimized in a transmittance according to an incident angle.

According to another aspect of the present disclosure, a sliding smart window may include: any one of smart windows as described above; a frame surrounding an edge of the smart window; and rollers disposed over an outer side of the frame in the second sub-direction.

According to another aspect of the present disclosure, a smart window for a vehicle may include any one of smart windows as described above, wherein a length of a first edge in the second sub-direction is shorter than a length of a second edge in a direction opposite to the second sub-direction.

The first edge may be located adjacent to a roof, and the second edge may be located adjacent to a bonnet or a trunk.

According to another aspect of the present disclosure, a sun visor for a vehicle may include any one of smart windows as described above.

According to another aspect of the present disclosure, a head-mounted smart window device may include: any one of smart windows as described above; and a mounting part connected to the smart window.

The mounting part may include: a frame connected to the smart window; and a fastening buckle connected to the frame or a temple connected to the frame. The mounting part may include a helmet body.

Other aspects, features, and advantages other than those described above will become apparent from the following detailed description, claims, and drawings for implementing the disclosure.

MODE OF DISCLOSURE

While example embodiments are capable of various modifications and alternative forms, embodiments thereof are shown by way of example in the drawings and will herein be described in detail. The effects and features of the present disclosure and the accompanying methods thereof will become apparent from the following description of the embodiments, taken in conjunction with the accompanying drawings. However, the present disclosure is not limited to the embodiments described below and may be embodied in various modes.

Hereinafter, embodiments of the present disclosure will be described in detail with reference to the accompanying drawings, the same or corresponding components will be given the same reference numerals when being described with reference to the drawings, and repeated description thereof will be omitted.

In the following embodiments, when various components such as layers, films, regions, plates, etc. are referred to as being "on" another component, the components may be "directly on" other components or intervening components may also be present. Also, for convenience of description, the sizes of components may be exaggerated or reduced in the drawings. For example, since the sizes and thicknesses of respective components shown in the drawings are randomly shown for convenience of description, the present disclosure is not limited to those that are illustrated.

In the following embodiments, x-axis, y-axis, and z-axis are not limited to three axes on an orthogonal coordinate system and may be interpreted in a broad sense including the same. For example, the x-axis, y-axis, and z-axis may be orthogonal to each other but may refer to different directions that are not orthogonal to each other.

Figure 2:
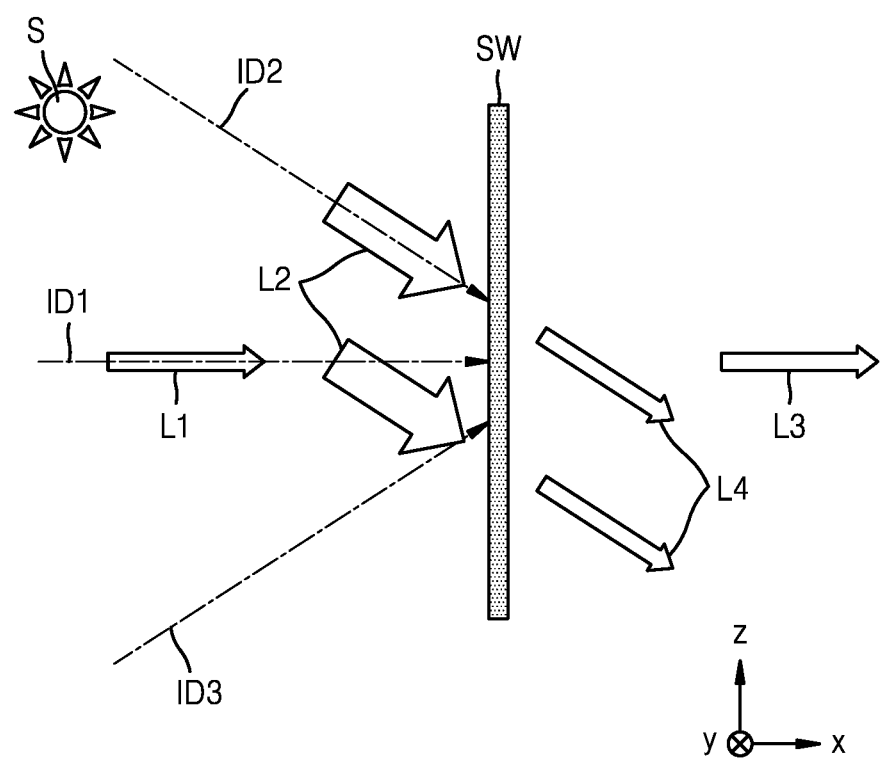

FIGS. 1 and 2 are conceptual views schematically illustrating an operation principle of a smart window SW according to an embodiment of the present disclosure. FIG. 1 illustrates that a smart window SW is in a first state, and FIG. 2 illustrates that the smart window SW is in a second state.

As illustrated in FIG. 1, a smart window SW in a first state may have the same function as a normal window. In other words, most of light entering the smart window SW from the outside (in a −x direction) may pass through the smart window SW and enters a room (in a +x direction). The amount of light passing through the smart window SW may be less than the amount of light entering the smart window SW, but a transmittance is not significantly changed according to incident conditions.

As illustrated in FIG. 1, light L1 incident from the outside of the smart window (in the −x direction) in a first incident direction ID1 approximately perpendicular to the smart window SW becomes transmitted light L3 which passes through the smart window SW and enters the room (in the +x direction). Also, when a bright light source such as the sun S exists outside the smart window SW (in the −x direction), direct light from such a light source usually becomes light L2 incident in a second incident direction ID2 which is not perpendicular to the smart window SW, and the light L2 also becomes transmitted light L4 which passes through the smart window SW and enters the room (in the +x direction). In the case of the smart window SW in the first state, a difference in a transmittance according to an incident angle of incident light is not large. Therefore, a ratio of the transmitted light L3 to the light L1 incident in the first incident direction ID1 is approximately similar to a ratio of the transmitted light L4 to the light L2 incident in the second incident direction ID2. Accordingly, in this case, a person located indoors experiences glare from a bright light source such as the outdoor sun S.

As illustrated in FIG. 2, even in a case of the smart window SW in a second state, a ratio of transmitted light L3 to light L1 incident in the first incident direction ID1 is maintained approximately similar to the ratio of the transmitted light L3 to the light L1 incident in the first incident direction ID1 when in the first state. However, in the case of the smart window SW in the second state, a ratio of transmitted light L4 to light L2 incident in the second incident direction ID2 is sharply reduced than a ratio of the transmitted light L4 to the light L2 incident in the second incident direction ID2 when in the first state. Therefore, a person located indoors does not experience glare from such a light source even when a bright light source such as the sun S exists outdoors. As the light L1 which may be referred to as ambient light in a direction in which such a light source does not exist is incident in the first incident direction ID1 not in the second incident direction ID2, a person located indoors may stably observe the outdoors without experiencing glare.

Therefore, the smart window SW according to the present embodiment may maintain the first state when a bright light source such as the sun S does not exist outdoors and maintain the second state when a bright light source such as the sun S exists outdoors, thereby maintaining external visibility to a certain level while preventing a person located indoors from experiencing glare.

For reference, as illustrated in FIG. 2, light which is incident from the outside in a third incident direction ID3 symmetrical to the second incident direction ID2 with respect to the first incident direction ID1 within a virtual plane including the first incident direction ID1 and the second incident direction ID2 may pass through the smart window SW at a level similar to or higher than a ratio of the transmitted L3 to the light L1 incident in the first incident direction ID1 even when the smart window SW is in the second state.

Figure 3:
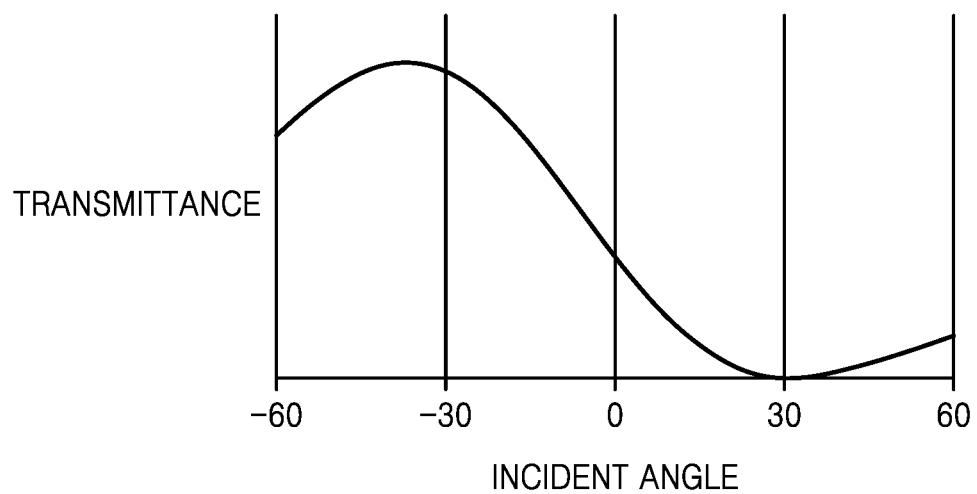
FIG. 3 is a graph schematically showing transmittance characteristics of the smart window of FIG. 1.

FIG. 3 is a graph schematically showing transmittance characteristics when the smart window SW of FIG. 1 is in the second state. In FIG. 3, a case in which an incident angle is 0° indicates a transmittance when light from a light source located in a direction perpendicular to the smart window SW enters the smart window SW, a case in which the incident angle is a positive number indicates a transmittance when light from a light source located higher than the direction perpendicular to the smart window SW enters the smart window SW, and a case in which the incident angle is a negative number indicates a transmittance when light from a light source located lower than the direction perpendicular to the smart window SW enters the smart window SW.

As illustrated in FIG. 3, when the smart window SW is in the second state, the transmittance when the light from the light source located higher than the direction perpendicular to the smart window SW enters the smart window SW may be lowered such that a person located indoors does not experience glare from a light source such as the sun S. As a bright light source is highly likely not to exist in a direction perpendicular to or lower than the smart window SW, a transmittance of light from that direction may be maintained relatively high to thereby maintain external visibility to a certain level while preventing a person located indoors from experiencing glare.

The smart window SW as described above may be implemented using liquid crystals. In detail, the smart window SW may include a first substrate to be located in an indoor direction, a second substrate to be located in an outdoor direction, and a liquid crystal layer located therebetween, wherein the first substrate and the second substrate are transparent and arranged to face each other. The smart window SW may also include a first electrode which is transparent and a first alignment layer which is rubbed in a first direction, the first electrode and the first alignment layer being sequentially disposed over a surface of the first substrate facing the second substrate, and may also include a second electrode which is transparent and a second alignment layer which is rubbed in a second direction different from the first direction, the second electrode and the second alignment layer being sequentially disposed over a surface of the second substrate facing the first substrate.

In the smart window SW having such a structure, when a potential difference applied between a first electrode and a second electrode is referred to as V, a transmittance of light L1 incident from the outside into a room in a first incident direction ID1 perpendicular to a second substrate is referred to as a vertical transmittance, and a transmittance of light incident from the outside into the room in a second incident direction ID2 which is not perpendicular to the second substrate is referred to as a first inclined transmittance, the first inclined transmittance when V is not 0 (when the smart window SW is in the second state) may be made less than the vertical transmittance, and a difference between the vertical transmittance and the first inclined transmittance when V is not 0 (when the smart window SW is in the second state) may be made greater than a difference between the vertical transmittance and the first inclined transmittance when V is 0 (when the smart window SW is in the first state).

Also, as described above, when a transmittance of light incident from the outside into the room in a third incident direction ID2 symmetrical to the second incident direction ID2 with respect to the first incident direction ID1 within a virtual plane including the first incident direction ID1 and the second incident direction ID2 is referred to as a second inclined transmittance, the first inclined transmittance when V is not 0 (when the smart window SW is in the second state) may be made less than the second inclined transmittance. Also, as described above with reference to FIG. 3, the second inclined transmittance may be greater than the vertical transmittance.

Hereinafter, smart windows SW according to various embodiments of the present disclosure will be described in more detail with reference to the drawings.

Figure 4:
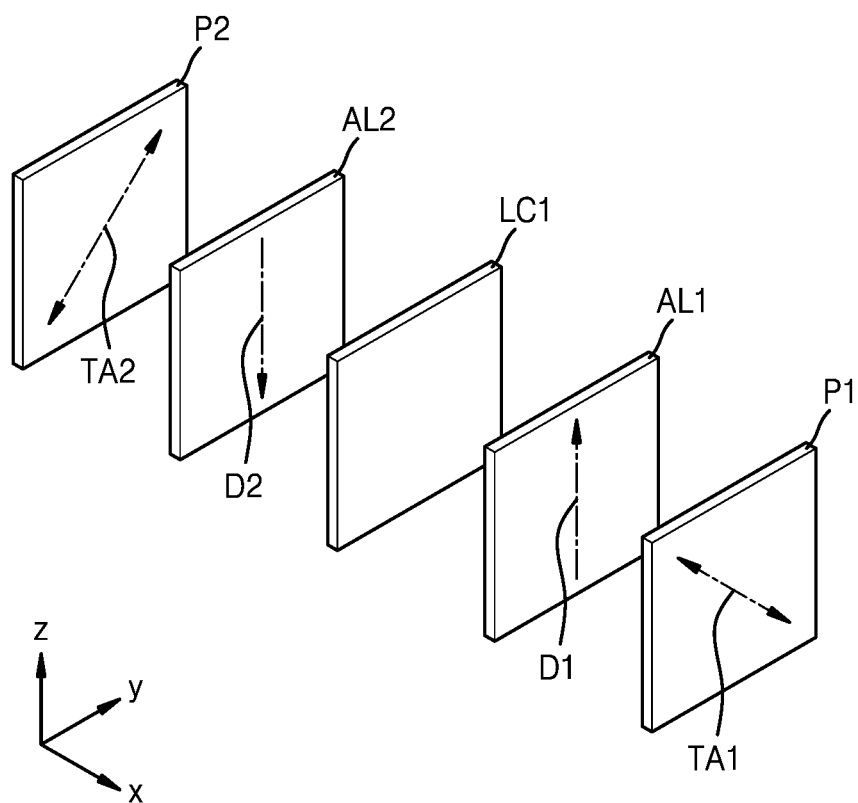
FIG. 4 is an exploded perspective view schematically illustrating some of components of a smart window according to an embodiment of the present disclosure.
Figure 5:
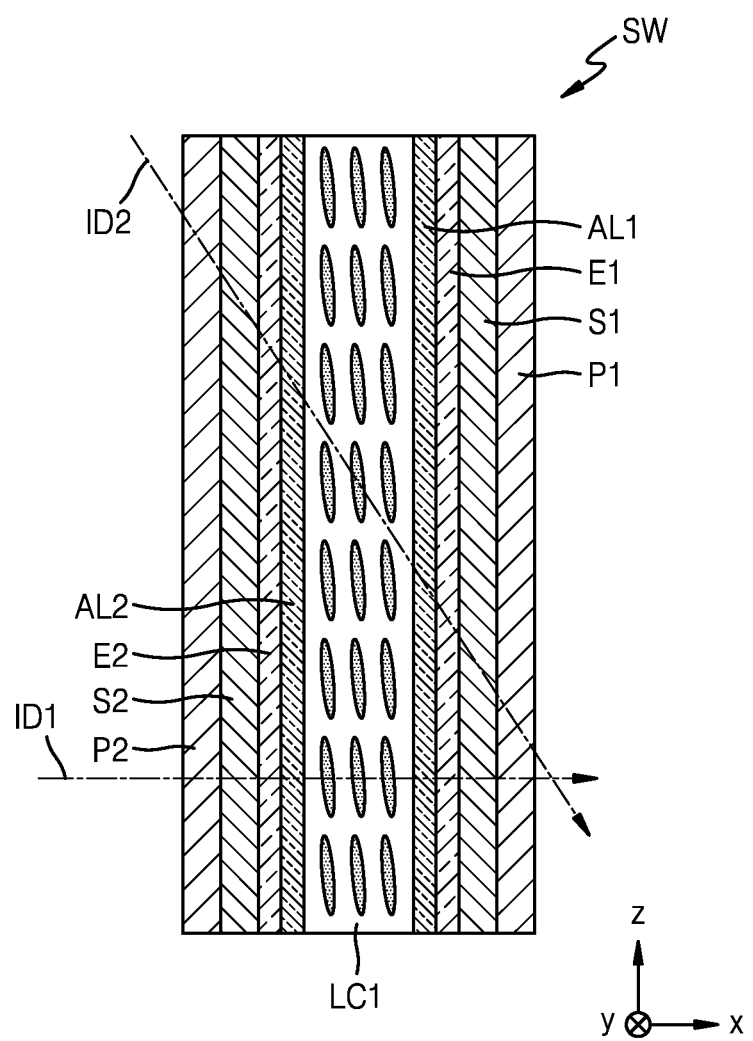
FIGS. 5 and 6 are cross-sectional views schematically illustrating an operation principle of the smart window of FIG. 4.
Figure 6:
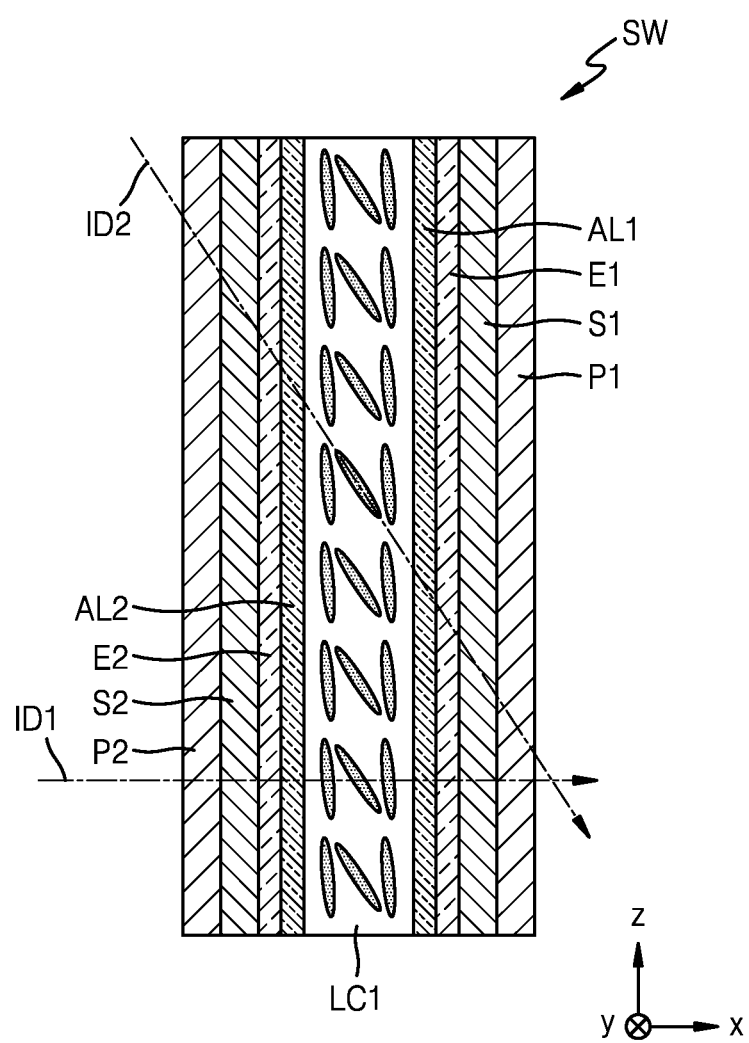

FIG. 4 is an exploded perspective view schematically illustrating some of components of a smart window SW according to an embodiment of the present disclosure, and FIGS. 5 and 6 are cross-sectional views schematically illustrating an operation principle of the smart window SW of FIG. 4. A first substrate S1, a second substrate S2, a first electrode E1, and a second electrode E2 from among components illustrated in FIGS. 5 and 6 are omitted from FIG. 4 for convenience. FIG. 5 illustrates that the smart window SW is in a first state, and FIG. 6 illustrates that the smart window SW is in a second state.

The first substrate S1 and the second substrate S2 face each other. The first substrate S1 and the second substrate S2 described above may include various types of materials, for example, may include a glass material or a transparent polymer material. In the latter case, the first substrate S1 and the second substrate S2 may include a polymer resin such as polyethersulphone (PES), polyacrylate (PAR), polyetherimide (PEI), polyethylene napthalate (PEN), polyethylene terephthalate (PET), polyphenylene sulfide (PPS), polyarylate (PAR), polyimide (PI), polycarbonate (PC), or cellulose acetate propionate (CAP). As such a polymer resin has flexible characteristics, the smart window SW may be implemented in various shapes according to various uses.

The first electrode E1 and a first alignment layer AL1 are sequentially disposed over a surface of the first substrate S1 facing the second substrate S2 (in a −x direction). The first electrode E1 may include a material which is transparent and conductive. For example, the first electrode E1 may include indium tin oxide (ITO), indium zinc oxide (IZO), zinc oxide (ZnO), indium oxide (In2O3), indium gallium oxide (IGO), or aluminum zinc oxide (AZO). The first electrode E1 may be a common electrode corresponding to most of the first substrate S1. The first alignment layer AL1 may include polyimide, polyvinyl alcohol, polyamide acid, or the like. The first alignment layer AL1 is rubbed in a first direction D1 (in a +z direction). Here, the first direction D1 is parallel to a virtual straight line on which a virtual plane including a first incident direction ID1 and a second incident direction ID2 intersects with a surface of the second substrate S2 (a yz plane) in the outdoor direction (in a −x direction).

The second electrode E2 and a second alignment layer AL2 are sequentially disposed over a surface of the second substrate S2 facing the first substrate S1 (in a +x direction). As a material which may be included in the second electrode E2 and the second alignment layer AL2, the material described for the first electrode E1 and the first alignment layer AL1 may be applied. The second electrode E2 may be a common electrode corresponding to most of the second substrate S2. The second alignment layer AL2 is rubbed in a second direction D2 (in a −z direction) different from the first direction D1. The second direction D2 is also parallel to the virtual straight line on which the virtual plane including the first incident direction ID1 and the second incident direction ID1 intersects with the surface of the second substrate S2 (the yz plane) in the outdoor direction (in the −x direction). However, the first direction D1 and the second direction D2 are different and thus eventually become opposite to each other. The second incident direction ID2 may be expressed as a sum of a first sub-direction (the +x direction) perpendicular to the second substrate S2 and a second sub-direction (the −z direction) parallel to the second substrate S2. Here, the second direction D2 coincides with the second sub-direction (the −z direction).

A liquid crystal layer LC1 is located between the first alignment layer AL1 and the second alignment layer AL2. The liquid crystal layer LC1 is a liquid crystal layer which operates in an electrically controlled birefringence (ECB) mode. Also, a first polarizing plate P1 is disposed over a surface of the first substrate S1 in a direction (the +x direction) opposite to the direction of the second substrate S2, and a second polarizing plate P2 is disposed over a surface of the second substrate S2 in a direction (the −x direction) opposite to the direction of the first substrate S1. Each of the first polarizing plate P1 and the second polarizing plate P2 may be a linear polarizing plate. A transmission axis TA1 of the first polarizing plate P1 is at an angel of 45° with the virtual straight line on which the virtual plane including the first incident direction ID1 and the second incident direction ID2 intersects with the surface of the second substrate S2 (the yz plane) in the outdoor direction (the −x direction). Also, a transmission axis TA2 of the second polarizing plate P2 is perpendicular to the transmission axis TA1 of the first polarizing plate P1. Here, the term "perpendicular" includes the case of being substantially perpendicular as well as the case of being mathematically perpendicular.

As described above, since the first alignment layer AL1 is rubbed in the first direction D1 (the +z direction), and the second alignment layer AL2 is rubbed in the second direction D2 (the −z direction), as illustrated in FIG. 5 in which a potential difference between the first electrode E1 and the second electrode E2 is 0, liquid crystals of the liquid crystal layer LC1 are in a slightly inclined state, not parallel to the first substrate S1 and the second substrate S2. In detail, in the case of liquid crystals near the first alignment layer AL1, a distance between ends of the liquid crystals in the first direction D1 (the +z direction) and the first alignment layer AL1 is longer than a distance between ends of the liquid crystals in a direction opposite to the first direction D1 (the +z direction) and the first alignment layer AL1. In the case of liquid crystals near the second alignment layer AL2, a distance between ends of the liquid crystals in the second direction D2 (the −z direction) and the second alignment layer AL2 is longer than a distance between ends of the liquid crystals in a direction opposite to the second direction D2 (the −z direction) and the second alignment layer AL2.

In such a state, when a potential difference between the first electrode E1 and the second electrode E2 is not 0, locations of the liquid crystals in the liquid crystal layer LC1 are changed as illustrated in FIG. 6. In detail, since liquid crystals near the first alignment layer AL1 or the second alignment layer AL2 are affected by the first alignment layer AL1 or the second alignment layer AL2, directions thereof are not significantly different than when the potential difference between the first electrode E1 and the second electrode E2 is 0. However, directions of liquid crystals located at the center of the liquid crystal layer LC1 are changed by an electromagnetic field when the potential difference between the first electrode E1 and the second electrode E2 is not 0. However, due to a rubbing direction of each of the first alignment layer AL1 and the second alignment layer AL2 as described above, the liquid crystals located at the center of the liquid crystal layer LC1 do not change the directions thereof in a state approximately perpendicular to the first substrate S1 and the second substrate S2 and are inclined in the second incident direction ID2 as illustrated in FIG. 6.

As illustrated in FIG. 5, when the smart window SW is in a first state, only light linearly polarized in a direction of the transmission axis TA2 of the second polarizing plate P2 while passing through the second polarizing plate P2 passes through the second substrate S2, passes through the liquid crystal layer LC1, and enters the first polarizing plate P1. Here, since the liquid crystal layer LC1 is a liquid crystal layer operating in the ECB mode, when a wavelength of light incident on the second polarizing plate P2 is λ and the thickness of the liquid crystal layer LC1 is d, refractive index anisotropy Δn(V) of the liquid crystal layer LC1 is a function of a voltage V applied between the first electrode E1 and the second electrode E2 and has a maximum value $n_e - n_o$ when V is 0. Therefore, the transmittance of the smart window SW is roughly expressed as in Equation 1 below. For reference, $n_e$ is an abnormal light refractive index of the liquid crystal layer LC1, and $n_o$ is a normal light refractive index of the liquid crystal light LC1.

$$T = \frac{1}{2}\sin^2\left(\pi\frac{(n_e - n_o)d}{\lambda}\right) \quad (1)$$

In the case of the smart window SW in the first state as illustrated in FIG. 5, such a transmittance is maintained approximately constant even when an incident angle is changed.

However, when the smart window SW is in the second state as illustrated in FIG. 6, a transmittance of light incident from the outside in the first incident direction ID1 and a transmittance of light incident from the outside in the second incident direction ID2 are changed. This is because, as described above, due to the rubbing direction of each of the first alignment layer AL1 and the second alignment layer AL2, the liquid crystals located at the center of the liquid crystal layer LC1 do not change the directions thereof in the state approximately perpendicular to the first substrate S1 and the second substrate S2 and are inclined in the second incident direction ID2 as illustrated in FIG. 6. In detail, only light linearly polarized in the direction of the transmission axis TA2 of the second polarizing plate P2 while passing through the second polarizing plate P2 passes through the second substrate S2 and enters the liquid crystal layer LC1. In this case, since the liquid crystals located at the center of the liquid crystal layer LC1 are inclined in the second incident direction ID2, light incident on the second substrate S2 from the outside in the second incident direction ID2 approximately maintains the linear polarization state thereof when passing through the liquid crystal layer LC1, passes through the first substrate S1, and enters the first polarizing plate P1. In this case, since the transmission axis TA1 of the first polarizing plate P1 is perpendicular to the transmission axis TA2 of the second polarizing plate P2, as a result, the transmittance of light incident on the second substrate S2 from the outside in the second incident direction ID2 is rapidly lowered with respect to the smart window SW.

Even in the case of light incident on the second substrate S2 from the outside in the first incident direction ID1, only light linearly polarized in the direction of the transmission axis TA2 of the second polarizing plate P2 passes through the second substrate S2 and enters the liquid crystal layer LC1, wherein, when this light passes through the liquid crystal layer LC1, the linear polarization state thereof is changed. Accordingly, when this light passes through the first substrate S1 and the first polarizing plate P1, the transmittance thereof is higher than the transmittance of light incident on the second substrate S2 from the outside in the second incident direction ID2.

For reference, FIGS. 4 through 6 that the smart window SW does not include a phase difference plate, but the present disclosure is not limited thereto. A phase difference plate may be located on a surface of the first substrate S1 in a direction opposite to the direction of the second substrate S2 or on a substrate of the second substrate S2 in a direction opposite to the direction of the first substrate S1. Alternatively, a first phase difference plate may be located on a surface of the first substrate S1 in a direction opposite to the direction of the second substrate S2, and a second phase difference plate may be located on a surface of the second substrate S2 in a direction opposite to the direction of the first substrate S1. An initial transmittance of the smart window SW may be set by adjusting the phase delay amount of such a phage difference plate or the total phase delay amount of phase difference plates.

Figure 7:
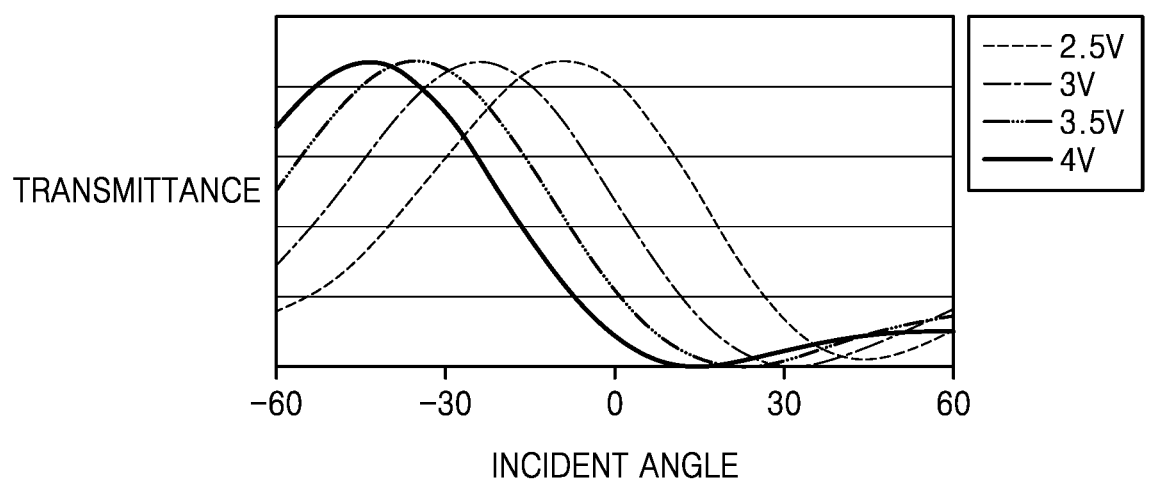
FIG. 7 is a graph showing changes in transmittance characteristics of the smart window of FIG. 6.

FIG. 7 is a graph showing changes in transmittance characteristics of the smart window of FIGS. 4 through 6, and a phase difference plate is also provided. FIG. 7 illustrates that $(n_e-n_o)d$ of the liquid crystal layer LC1 is 560 nm, the total phase delay amount is 117.6 nm and shows changes in the transmittance according to an incident angle when a potential difference between the first electrode E1 and the second electrode E2 is 2.5 V, 3V, 3.5 V, and 4 V. In any case, on the basis of the transmittance of light having an incident angle of 0°, i.e., on the basis of the transmittance of light incident in the first incident direction ID1 which is a direction approximately perpendicular to the second substrate S2, within a certain section, the transmittance decreases as the incident angle increases.

The degree to which the transmittance decreases and the angle at which the minimum transmittance appears vary according to the potential difference between the first electrode E1 and the second electrode E2. Referring to FIG. 7, as the potential difference between the first electrode E1 and the second electrode E2 increases, the angle at which the minimum transmittance appears decreases. As a result, indoor glare may always be minimized by adjusting the potential difference between the first electrode E1 and the second electrode E2 according to the location of a strong light source such as the sun located outdoors. For example, since the altitude of the sun becomes high during the morning until midday, the potential difference between the first electrode E1 and the second electrode E2 may be gradually decreased over time. Since the altitude of the sun becomes low over time in the afternoon, the potential difference between the first electrode E1 and the second electrode E2 may also be gradually increased over time.

Figure 8:
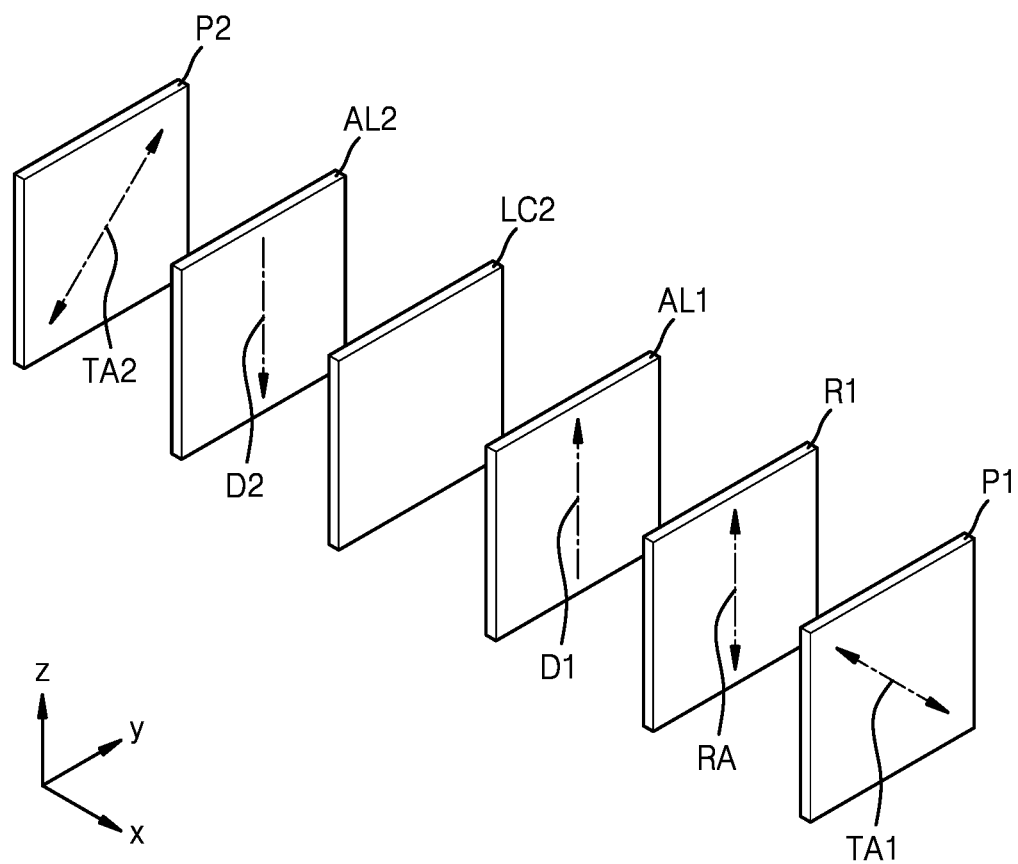
FIG. 8 is an exploded perspective view schematically illustrating some of components of a smart window according to another embodiment of the present disclosure.
Figure 9:
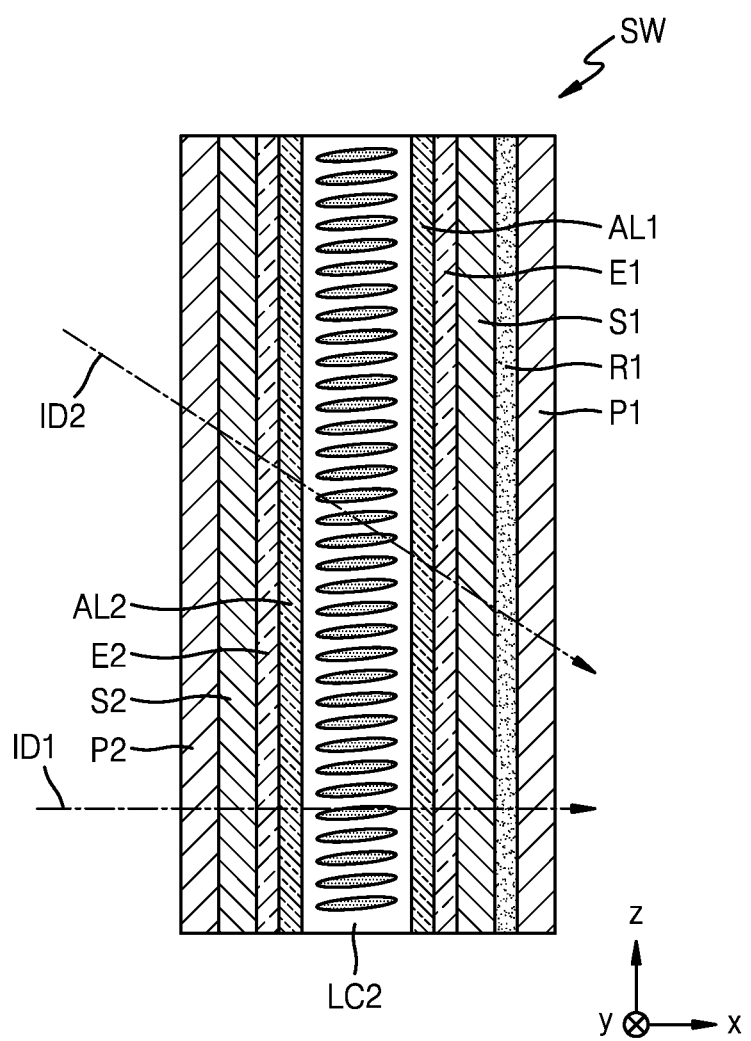
FIGS. 9 and 10 are cross-sectional views schematically illustrating an operation principle of the smart window of FIG. 8.
Figure 10:
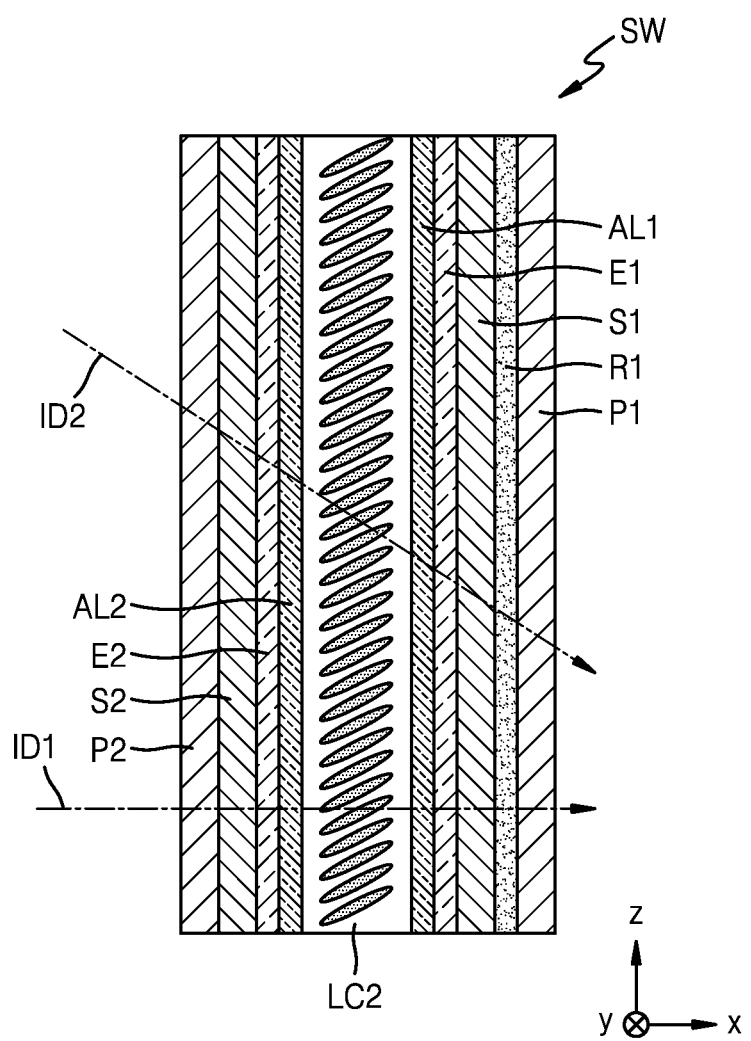

FIG. 8 is an exploded perspective view schematically illustrating some of components of a smart window SW according to another embodiment of the present disclosure, and FIGS. 9 and 10 are cross-sectional views schematically illustrating an operation principle of the smart window SW of FIG. 8.

A first substrate S1, a second substrate S2, a first electrode E1, and a second electrode E1 from among components illustrated in FIGS. 9 and 10 are omitted from FIG. 8 for convenience. FIG. 9 illustrates that the smart window SW is in a first state, and FIG. 10 illustrates that the smart window SW is in a second state.

Descriptions of the first substrate S1, the second substrate S2, the first electrode E1, the second electrode E2, a first polarizing plate P1, a first transmission axis TA1, a second polarizing plate P2, a second transmission axis TA2, a first alignment layer AL1, a first direction D1, a second alignment layer AL2, and a second direction D2 are the same as those of the smart window according to the embodiment described above with reference to FIGS. 4 through 6 and thus are omitted herein. The smart window SW according to the present embodiment is different from the smart window according to the embodiment described above with reference to FIGS. 4 through 6 in that a liquid crystal layer LC2 located between the first alignment layer AL1 and the second alignment layer AL2 operates in a vertical alignment (VA) mode. Also, the smart window SW according to the present embodiment may include a phase difference plate R1.

As illustrated in FIG. 9, the phase difference plate R1 may be located on a surface of the first substrate S1 in a direction opposite to a direction of the second substrate S2, but the present disclosure is not limited thereto. For example, a phase difference plate may be located on a surface of the second substrate S2 in a direction opposite to a direction of the first substrate S1 Alternatively, a first phase difference plate may be located on the surface of the first substrate S1 in the direction opposite to the direction of the second substrate S2, and a second phase difference plate may be located on the surface of the second substrate S2 in the direction opposite to the direction of the first substrate S1. The phase delay amount of such a phase difference plate or the total phase delay amount of phase difference plates may be made greater than 0 and less than or equal to $\lambda/2$ when a wavelength of light incident entering the smart window SW is $\lambda$. $\lambda$ may be set, for example, to 550 nm corresponding to a green wavelength. An initial transmittance of the smart window SW may be set by adjusting the phase delay amount as described above.

For convenience of description, FIGS. 8 through 10 illustrate that the phase difference plate R1 is located on the surface of the first substrate S1 in the direction opposite to the direction of the second substrate S2, i.e., between the first substrate S1 and the first polarizing plate P1. Hereinafter, for convenience, the phase delay amount of the phase difference plate R1 that is less than $\lambda/2$ will be described. However, the smart window SW according to the present embodiment is not limited thereto, and the same also applies to embodiments described below and embodiments according to modified examples thereof. A phase delay axis RA of the phase difference plate R1 is parallel to a virtual straight line on which a virtual plane including a first incident direction ID1 and a second incident direction ID2 intersects with a surface of the second substrate S2 (a yz plane) in an outdoor direction (a −x direction). In other words, the phase delay axis RA of the phase difference plate R1 is parallel to a z axis.

The liquid crystal layer LC2 is located between the first alignment layer AL1 and the second alignment layer AL2. As described above, the liquid crystal layer LC2 is a liquid crystal layer which operates in a VA mode. As described above, since the first alignment layer AL1 is rubbed in the first direction D1 (a +z direction) and the second alignment layer AL2 is rubbed in the second direction D2 (the −z direction), as illustrated in FIG. 9 in which a potential difference between the first electrode E1 and the second electrode E2 is 0, liquid crystals of the liquid crystal layer LC2 are in a slightly inclined state, not perpendicular to the first substrate S1 and the second substrate S2. In detail, ends of the liquid crystals in a direction of the first alignment layer AL1 are further inclined in the first direction D1 (the +z direction) than ends of the liquid crystals in a direction of the second alignment layer AL2.

In such a state, when a potential difference between the first electrode E1 and the second electrode E2 is not 0, the locations of the liquid crystals in the liquid crystal layer LC2 are changed by an electromagnetic field as illustrated in FIG. 10. As described above, when the potential difference between the first electrode E1 and the second electrode E2 is 0, the ends of the liquid crystals in the direction of the first alignment layer AL1 are further inclined in the first direction D1 (the +z direction) than the ends of the liquid crystals in the direction of the second alignment layer AL2. Therefore, when the potential difference between the first electrode E1 and the second electrode E2 is not 0, the liquid crystals are inclined in a direction opposite to the second incident direction ID2 on the basis of the x axis perpendicular to the second substrate S2 as illustrated in FIG. 10, not parallel to the first substrate S1 and the second substrate S2.

As illustrated in FIG. 9, when the smart window SW is in a first state, only light linearly polarized in the direction of the second transmission axis TA2 of the second polarizing plate P2 while passing through the second polarizing plate P2 passes through the second substrate S2, passes through the liquid crystal layer LC2 and the phase difference plate R1, and enters the first polarizing plate P1. When the light linearly polarized in the direction of the second transmission axis TA2 of the second polarizing plate P2 passes through the liquid crystal layer LC2, the phase thereof is not nearly changed. Therefore, in a case of light incident from the outside in the first incident direction ID1, a sum of the phase delay amounts in the phase different plate R1 and the liquid crystal layer LC2 becomes the phase delay amount $R_0$ of only the phase difference plate R1, and a transmittance is expressed as in Equation 2 below.

$$T = \frac{1}{2}\sin^2\left(\pi\frac{R_0}{\lambda}\right) \quad (2)$$

In a case of light in the second incident direction ID2, the phase delay amount $\Delta nd = \Delta n \times d$ of the liquid crystal layer LC2 is added, and a transmittance is expressed as in Equation 3 below. Here, $\Delta n$ appears as a function of a voltage V as described above. In this case, since the total phase delay amount $R_0 + \Delta nd$ which is the sum of the phase delay amounts in the phase difference plate R1 and the liquid crystal layer LC2 is sufficiently less than $\lambda$, a transmittance of light incident from the outside in the second incident direction ID2 may be significantly lower than a transmittance of light incident from the outside in the first incident direction ID1. Therefore, when the smart window SW is in the first state, a transmittance of incident light does not have a large deviation according to an incident angle.

$$T = \frac{1}{2}\sin^2\left(\pi\frac{R_0 + \Delta nd}{\lambda}\right) \quad (3)$$

However, as illustrated in FIG. 10, when the smart window SW is in a second state, a transmittance of light incident from the outside in the first incident direction ID1 and a transmittance of light incident from the outside in the second incident direction ID2 are changed. This is because, as described above, due to a rubbing direction of each of the first alignment layer AL1 and the second alignment layer AL2, the liquid crystals of the liquid crystal layer LC2 do not change the directions thereof in a state approximately parallel to the first substrate S1 and the second substrate S2 and are inclined in a direction opposite to the second incident direction ID2 on the basis of the x axis perpendicular to the second substrate S2 as illustrated in FIG. 10.

In detail, only light linearly polarized in the direction of the second transmission axis TA2 of the second polarizing plate P2 while passing through the second polarizing plate P2 passes through the second substrate S2 and enters the liquid crystal layer LC2. In this case, since the liquid crystals of the liquid crystal layer LC2 are inclined in the direction opposite to the second incident direction ID2 on the basis of the x axis perpendicular to the second substrate S2, when light incident on the second substrate S2 from the outside in the second incident direction ID2 passes through the liquid crystal layer LC2, the phase delay amount $\Delta nd$ of the liquid crystal layer LC2 is sufficiently great, and the total phase delay amount $R_0 + \Delta nd$ which is the sum of the phase delay amounts in the phase difference plate R1 and the liquid crystal layer LC2 has a value close to $\lambda$. Therefore, according to Equation 3 described above, a first inclined transmittance which is the transmittance of the light incident on the second substrate S2 from the outside in the second incident direction ID2 becomes approximately close to 0 and thus becomes a value significantly lower than a vertical transmittance.

Even in a case of light incident on the second substrate S2 from the outside in the first incident direction ID1, only light linearly polarized in the direction of the second transmission axis TA2 of the second polarizing plate P2 passes through the second substrate S2 and enters the liquid crystal layer LC2. Thereafter, when this light passes through the liquid crystal layer LC2, the linear polarization state thereof is not significantly changed. Therefore, in a case of light incident from the outside in the first incident direction ID1, the sum of the phase delay amounts in the phase difference plate R1 and the liquid crystal layer LC2 becomes the phase delay amount $R_0$ of only the phase difference plate R1, and a transmittance is expressed as in Equation 2 described above and becomes higher than a transmittance of the light incident on the second substrate S2 from the outside in the second incident direction ID2.

Figure 11:
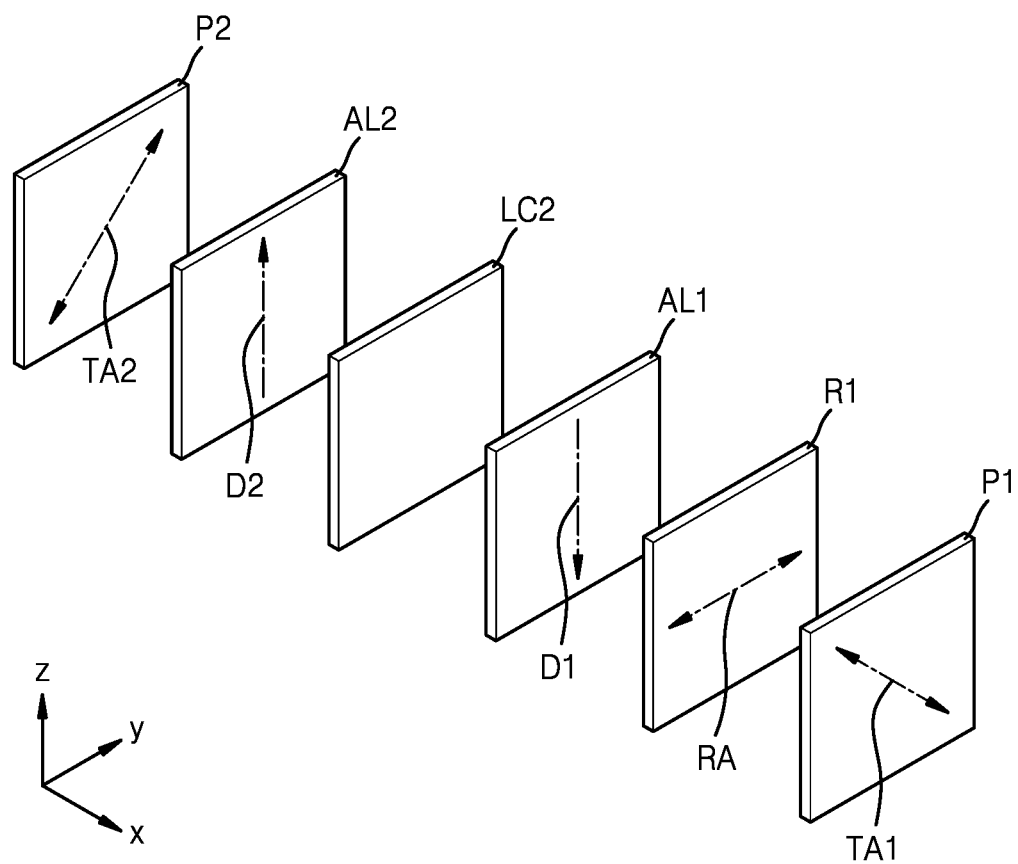
FIG. 11 is an exploded perspective view schematically illustrating some of components of a smart window according to another embodiment of the present disclosure.
Figure 12:
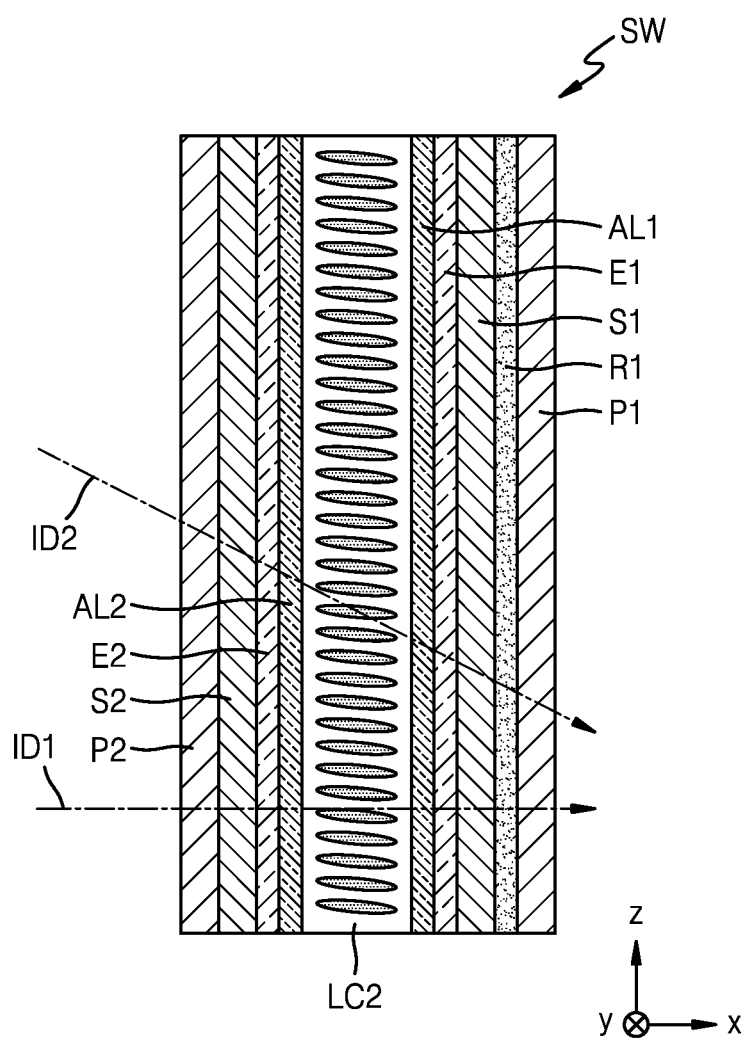
FIGS. 12 and 13 are cross-sectional views schematically illustrating an operation principle of the smart window of FIG. 11.
Figure 13:
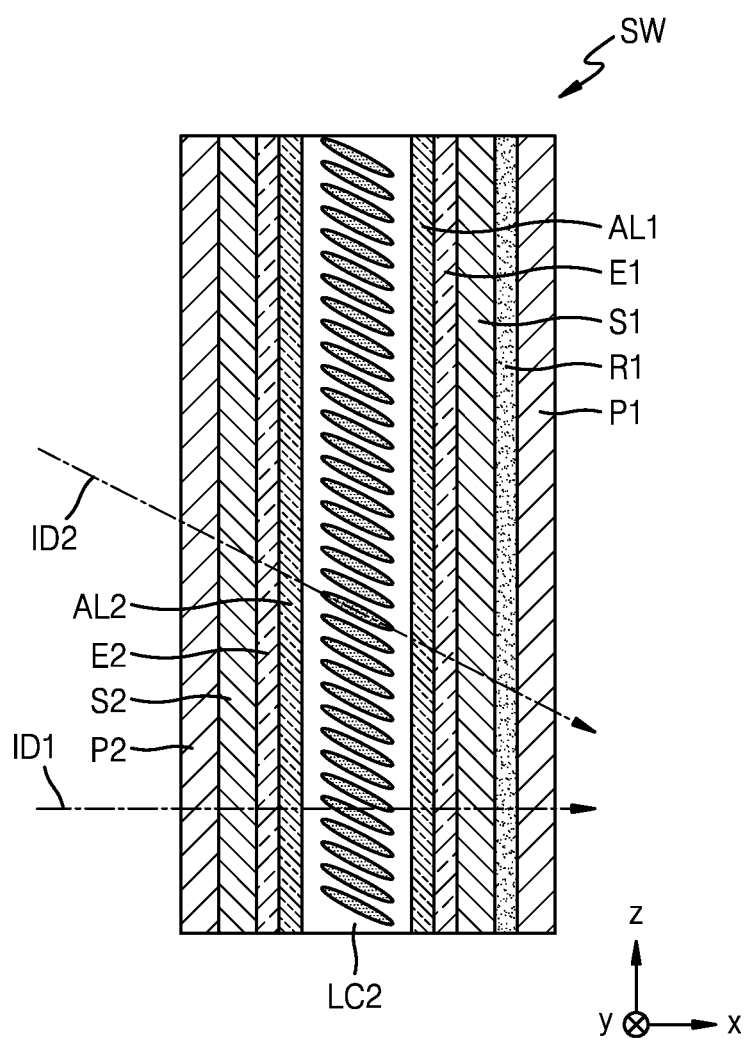

FIG. 11 is an exploded perspective view schematically illustrating some of components of a smart window SW according to another embodiment of the present disclosure, and FIGS. 12 and 13 are cross-sectional views schematically illustrating an operation principle of the smart window SW of FIG. 11. The smart window SW according to the present embodiment is different from the smart window described above with reference to FIGS. 8 through 10 in that a first direction D1 which is a rubbing direction of a first alignment layer AL1 is a −z direction, a second direction D2 which is a rubbing direction of a second alignment layer AL2 is a +z direction, and a phase delay axis RA of a phase difference plate R1 is perpendicular to a virtual straight line on which a virtual plane including the first incident direction ID1 and the second incident direction ID2 intersects with a surface of a second substrate S2 (a yz plane) in an outdoor direction (a −x direction). In other words, the phase delay axis RA of the phase difference plate R1 is parallel to a y axis. Therefore, a transmittance of the smart window SW is expressed as in Equation 4 below.

$$T = \frac{1}{2}\sin^2\left(\pi\frac{-R_0 + \Delta nd}{\lambda}\right) \quad (4)$$

A liquid crystal layer LC2 is located between the first alignment layer AL1 and the second alignment layer AL2. As described above, the liquid crystal layer LC2 is a liquid crystal layer which operates in a VA mode. As described above, since the first alignment layer AL1 is rubbed in the first direction D1 (the −z direction) and the second alignment layer AL2 is rubbed in the second direction D2 (the +z direction), as illustrated in FIG. 12 in which a potential difference between the first electrode E1 and the second electrode E2 is 0, liquid crystals of the liquid crystal layer LC2 are in a slightly inclined state, not perpendicular to the first substrate S1 and the second substrate S2. In detail, ends of the liquid crystals in a direction of the first alignment layer AL1 are further inclined in the first direction D1 (the −z direction) than ends of the liquid crystals in a direction of the second alignment layer AL2.

In such a state, when the potential difference between the first electrode E1 and the second electrode E2 is not 0, the locations of the liquid crystals in the liquid crystal layer LC2 are changed by an electromagnetic field as illustrated in FIG. 13. As described above, when the potential difference between the first electrode E1 and the second electrode E2 is 0, the ends of the liquid crystals in the direction of the first alignment layer AL1 are further inclined in the first direction D1 (the −z direction) than the ends of the liquid crystals in the direction of the second alignment layer AL2. Therefore, when the potential difference between the first electrode E1 and the second electrode E2 is not 0, the liquid crystals are inclined in the second incident direction ID2, not parallel to the first substrate S1 and the second substrate S2 as illustrated in FIG. 13.

As illustrated in FIG. 12, when the smart window SW is in a first state, only light linearly polarized in a direction of a transmission axis TA2 of a second polarizing plate P2 while passing through the second polarizing plate P2 passes through the second substrate S2, passes through the liquid crystal layer LC2 and the phase difference plate R1, and enters a first polarizing plate P1. When the light linearly polarized in the direction of the transmission axis TA2 of the second polarizing plate P2 passes through the liquid crystal layer LC2, the phase thereof is not nearly changed. Therefore, in a case of light incident from the outside in the first incident direction ID1, a sum of the phase delay amounts in the phase difference plate R1 and the liquid crystal layer LC2 becomes the phase delay amount −$R_0$ of only the phase difference plate R1, and a transmittance is expressed as in Equation 5 below.

$$T = \frac{1}{2}\sin^2\left(\pi\frac{-R_0}{\lambda}\right) \quad (5)$$

In a case of light in the second incident direction ID2, the phase delay amount Δnd of the liquid crystal layer LC2 is added, and a transmittance is expressed as in Equation 4 as described above. Here, since the total phase delay amount −$R_0$+Δnd that is the sum of the phase delay amounts in the phase difference plate R1 and the liquid crystal layer LC2 is sufficiently less than 0, the transmittance of light incident from the outside in the second incident direction ID2 may not be significantly lower than the transmittance of light incident from the outside in the first incident direction ID1.

However, as illustrated in FIG. 13, when the smart window SW is in a second state, the transmittance of the light incident from the outside in the first incident direction ID1 and the transmittance of the light incident from the outside in the second incident direction ID2 are changed. This is because, as described above, due to the rubbing direction of each of the first alignment layer AL1 and the second alignment layer AL2, the liquid crystals of the liquid crystal layer LC2 do not change the directions thereof in a state approximately parallel to the first substrate S1 and the second substrate S2 and are inclined in the second incident direction ID2 on the basis of a x axis perpendicular to the second substrate S2 as illustrated in FIG. 13.

In detail, when light incident on the second substrate S2 from the outside in the second incident direction ID2 passes through the liquid crystal layer LC2, the phase delay amount Δnd of the liquid crystal layer LC2 is approximately similar to an absolute value $R_0$ of the phase delay amount of the phase difference plate R1, and thus, the total phase delay amount −$R_0$+Δnd has a value close to 0. Therefore, the transmittance becomes close to 0 via Equation 4 as described above.

In a case of light incident on the second substrate S2 from the outside in the first incident direction ID1, the phase delay amount Δnd of the liquid crystal layer LC2 is greater than the absolute value $R_0$ of the phase delay amount of the phase difference plate R1, and thus, the total phase delay amount −$R_0$+Δnd has a value greater than 0. As a result, the transmittance has a value greater than 0 unlike the light incident from the outside in the second incident direction ID2.

Figure 14:
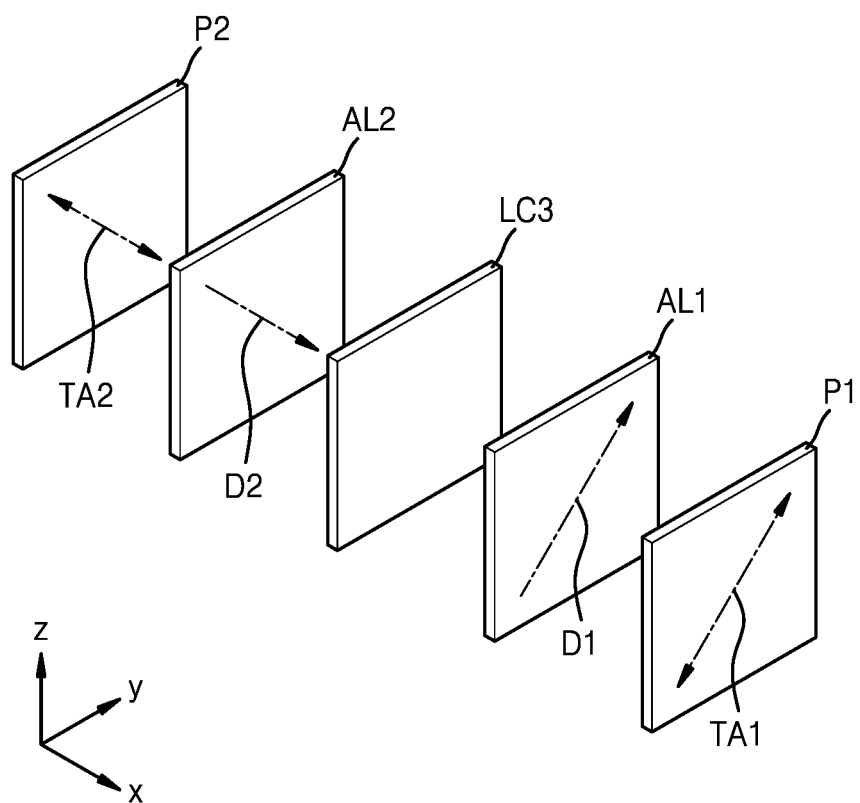
FIG. 14 is an exploded perspective view schematically illustrating some of components of a smart window according to another embodiment of the present disclosure.
Figure 15:
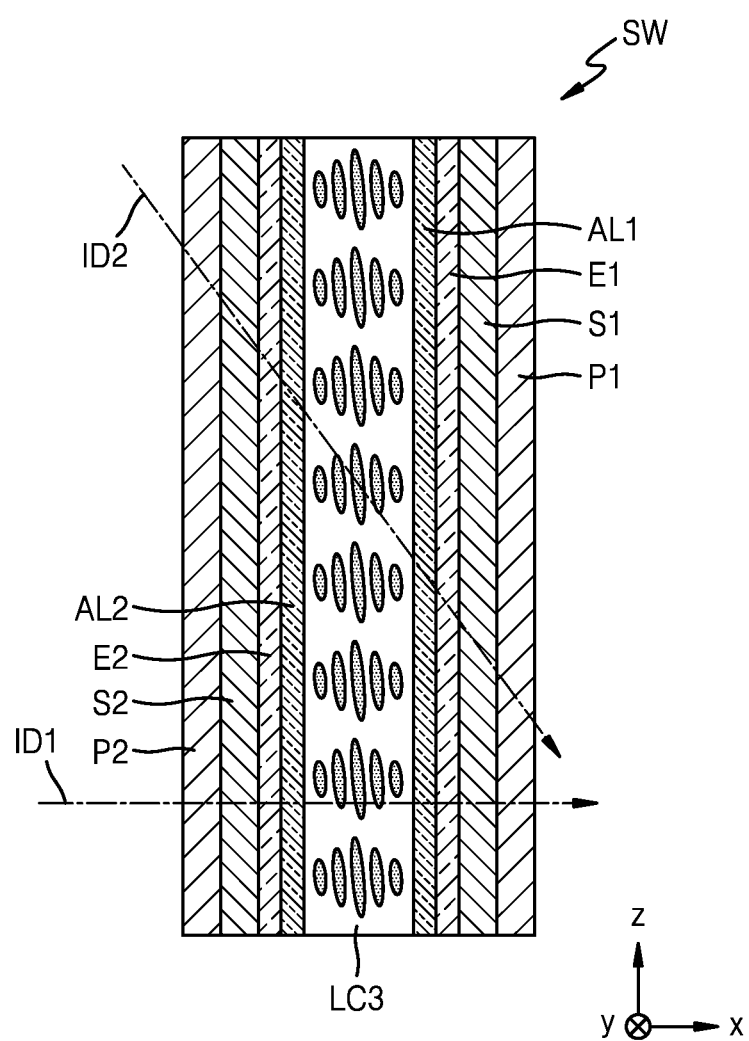
FIGS. 15 and 16 are cross-sectional views schematically illustrating an operation principle of the smart window of FIG. 14.
Figure 16:
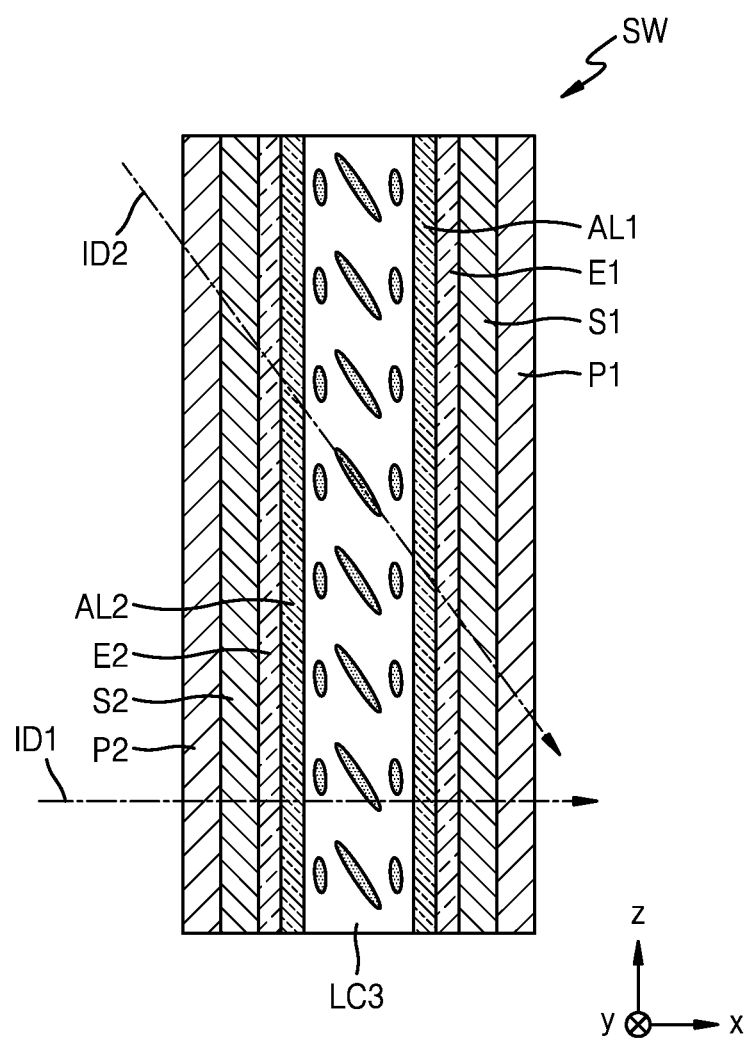

FIG. 14 is an exploded perspective view schematically illustrating some of components of a smart window SW according to another embodiment of the present disclosure, and FIGS. 15 and 16 are cross-sectional views schematically illustrating an operation principle of the smart window SW of FIG. 14.

The smart window SW according to the present embodiment is different from the smart window described above with reference to FIGS. 4 through 6 in that a first direction D1 in which a first alignment layer AL1 is rubbed is parallel to a surface of a second substrate S2 (a yz plane) in an outdoor direction (a −x direction) and is at an angle of 45° with a virtual straight line on which a virtual plane including a first incident direction ID1 and a second incident direction ID2 intersects with the surface of the second substrate S2 in the outdoor direction. Also, when the first direction D1 is expressed as a sum of a first auxiliary direction parallel to the virtual straight line (i.e., parallel to a z axis) and a second auxiliary direction perpendicular to the virtual straight line (i.e., parallel to a y axis), and the second incident direction ID2 is expressed as a sum of a first sub-direction perpendicular to the second substrate S2 (i.e., parallel to a x axis) and a second sub-direction parallel to the second substrate S2 (i.e., parallel to the z axis), the first auxiliary direction is a direction opposite to the second sub-direction (a −z direction). In addition, the second auxiliary direction is a direction rotated clockwise from the first auxiliary direction when looking at the second substrate S2 from the first substrate S1. Also, a second direction D2 is a direction rotated 90° clockwise from the first direction D1 when looking at the second substrate S2 from the first substrate S1. Moreover, the smart window SW according to the present embodiment is different from the smart window described above with reference to FIGS. 4 through 6 in that a transmission axis TA1 of a first polarizing plate P1 is parallel to the first direction D1 and a transmission axis TA2 of a second polarizing plate P2 is parallel to the second direction D2. Furthermore, a liquid crystal layer LC3 of the smart window SW according to the present embodiment is a liquid crystal layer which operates in a twisted nematic (TN) mode. The other matters in the smart window described above with reference to FIGS. 4 through 6 may also be applied to the smart window SW according to the present embodiment.

As described above, since the first alignment layer AL1 is rubbed in the first direction D1 and a second alignment layer AL2 is rubbed in the second direction D2 perpendicular to the first direction D1, as illustrated in FIG. 15 in which a potential difference between a first electrode E1 and a second electrode D2 is 0, liquid crystals of the liquid crystal layer LC2 are parallel to the first substrate S1 and the second substrate S2 but exist in a twisted state. Here, in liquid crystal molecules located near the first alignment layer AL1 and the second alignment layer AL2, a distance of the liquid crystal molecules at an end of a rubbing direction from an alignment layer becomes longer than a distance of the liquid crystal molecules at an end of a direction opposite to the rubbing direction from the alignment layer. This inclined angle is referred to as a pretilt angle.

In such a state, when the potential difference between the first electrode E1 and the second electrode E2 is not 0, the locations of the liquid crystals in the liquid crystal layer LC3 are changed as illustrated in FIG. 16. In detail, since liquid crystals near the first alignment layer AL1 or the second alignment layer Al2 are affected by the first alignment layer AL1 or the second alignment layer AL2, the directions thereof are not significantly different than when the potential difference between the first electrode E1 and the second electrode E2 is 0. However, directions of liquid crystals located at the center of the liquid crystal layer LC3 are changed by an electromagnetic field when the potential difference between the first electrode E1 and the second electrode E2 is not 0. However, the liquid crystals located at the center of the liquid crystal layer LC3 do not change the directions thereof in a state approximately perpendicular to the first substrate S1 and the second substrate S2 and are inclined in the second incident direction ID2 as illustrated in FIG. 16. The reason is that the free energy of liquid crystal molecules is arranged in the smallest state under the influence of the pretilt angle described above.

As illustrated in FIG. 15, when the smart window SW is in a first state, only light linearly polarized in a direction of the transmission axis TA of the second polarizing plate P2 while passing through the second polarizing plate P2 passes through the second substrate S2, passes through the liquid crystal layer LC3, and enters the first polarizing plate P1. Here, since the liquid crystal layer LC3 is the liquid crystal layer operating in the TN mode and is in the twisted state, the light linearly polarized in the direction of the transmission axis TA2 of the second polarizing plate P2 rotates the linear polarization direction thereof approximately 90° while passing through the liquid crystal layer LC3 and enters the first polarizing plate P1. Accordingly, since the linear polarization direction of the light incident on the first polarizing plate P1 approximately coincides with the transmission axis TA1 of the first polarizing plate P1, most of the light passes through the first polarizing plate P1. As a result, in the case of the smart window SW in the first state as illustrated in FIG. 15, a transmittance thereof is maintained approximately constant even when an incident angle is changed.

However, as illustrated in FIG. 16, when the smart window SW is in a second state, a transmittance of light incident from the outside in the first incident direction ID1 and a transmittance of light incident from the outside in the second incident direction ID2 are changed. This is because liquid crystals located at the center of the liquid crystal layer LC3 are not maintained in a twisted state in a state approximately parallel to the first substrate S1 and the second substrate S2 and are inclined in the second incident direction ID2 as illustrated in FIG. 16.

In detail, only light linearly polarized in the direction of the transmission axis TA2 of the second polarizing plate P2 while passing through the second polarizing plate P2 passes through the second substrate S2 and enters the liquid crystal layer LC3. In this case, since the liquid crystals located at the center of the liquid crystal layer LC3 are inclined in the second incident direction ID2, light incident on the second substrate S2 from the outside in the second incident direction ID2 approximately maintains the linear polarization state when passing through the liquid crystal layer LC3, passes through the first substrate S1, and enters the first polarizing plate P1. Here, since the transmission axis TA1 of the first polarizing plate P1 is perpendicular to the transmission axis TA2 of the second polarizing plate P2, as a result, the transmittance of the light incident on the second substrate S2 from the outside in the second incident direction ID2 is rapidly lowered with respect to the smart window SW.

In a case of light incident on the second substrate S2 from the outside in the first incident direction ID1, only light linearly polarized in the direction of the transmission axis TA2 of the second polarizing plate P2 passes through the second substrate S2 and enters the liquid crystal layer LC3. Thereafter, when this light passes through the liquid crystal layer LC3, the linear polarization state thereof is changed. The reason is that, although the liquid crystals located at the center of the liquid crystal layer LC3 are inclined in the second incident direction ID2, the liquid crystals remain in a twisted state when viewed in the first incident direction ID1. When light incident on the second substrate S2 from the outside in the first incident direction ID1 passes through the liquid crystal layer LC3, the linear polarization state thereof is changed. Therefore, the light is approximately parallel to the transmission axis TA1 of the first polarizing plate P1. Therefore, when the light passes through the first substrate S1 and the first polarizing plate P1, a transmittance thereof becomes higher than the transmittance of light incident on the second substrate S2 from the outside in the second incident direction ID2.

In various embodiments described above, a smart window SW has a first state and a second state. The smart window SW in the first state may have the same function as a normal window. In other words, most of light entering the smart window SW from the outside (in a −x direction) may pass through the smart window SW and enter a room (in a +x direction). The amount of light passing through the smart window SW may be less than the amount of light entering the smart window SW, but a transmittance is not significantly changed according to incident conditions.

Even in the case of the smart window SW in the second state, a ratio of transmitted light to light incident in a first incident direction ID1 is maintained approximately similar to a ratio of transmitted light to light incident in the first incident direction ID1 when in the first state. However, in the case of the smart window SW in the second state, a ratio of transmitted light to light incident in a second incident direction ID2 is sharply reduced than a ratio of transmitted light to light incident in the second incident direction ID2 when in the first state. Accordingly, even when a bright light source such as the sun S exists outdoors, a person located indoors does not experience glare from such a light source. Since light which may be referred to as ambient light in a direction in which such a light source does not exist is incident in the first incident direction ID1 not in the second incident direction ID, a person located indoors may stably observe the outdoors without experiencing glare.

Therefore, the smart window SW according to the present embodiment may maintain the first state when a bright light source such as the sun S does not exist outdoors and may maintain the second state when the bright light source such as the sun S exists outdoors to thereby maintain external visibility to a certain level while preventing a person located indoors from experiencing glare.

Figure 17:
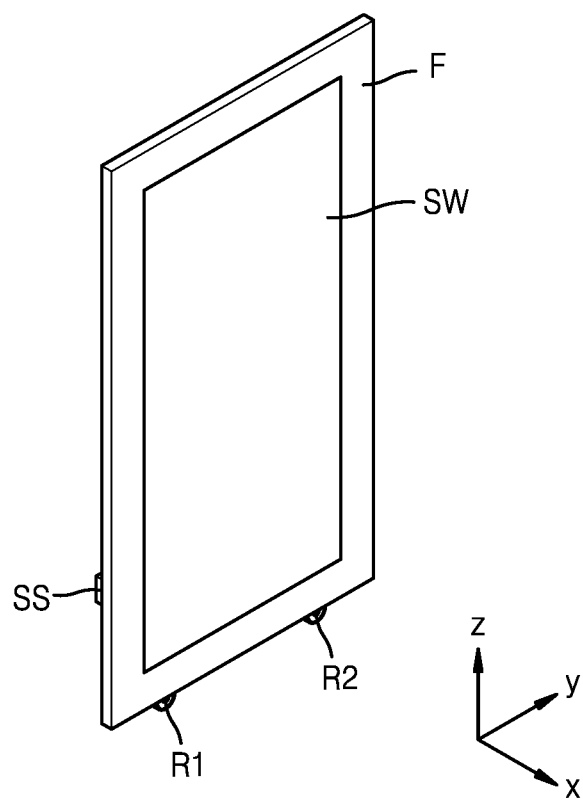
FIG. 17 is a perspective view schematically illustrating a sliding smart window according to another embodiment of the present disclosure.

FIG. 17 is a perspective view schematically illustrating a sliding smart window according to another embodiment of the present disclosure. As illustrated in FIG. 17, the sliding smart window according to the present embodiment includes a smart window SW according to any one of the above-described embodiments, a frame F surrounding an edge of the smart window SW, and rollers R1 and R2 disposed over an outer side of the frame F (in a −z direction). As described above, when a second incident direction ID2 is expressed as a sum of a first sub-direction (a +x direction) perpendicular to a second substrate S2 and a second sub-direction (a −z direction) parallel to the second substrate S2, it may be understood that the rollers R1 and R2 are disposed over the outer side of the frame F in the second sub-direction. Such a sliding smart window may be coupled to the chassis of a building and may be opened and closed in a sliding manner.

Such a sliding smart window may maintain a first state when a bright light source such as the sun S does not exist outdoors and maintain a second state when the bright light source such as the sun S exists outdoors to thereby maintain external visibility to a certain level while preventing a person located indoors from experiencing glare.

The sliding smart window may further include a sensing unit SS. The sensing unit SS is an incident angle sensing unit that recognizes an incident angle of sunlight. The sensing unit SS may generate data about a relative location, an angle, and the like of an external light source with respect to the sliding smart window by sensing the location of the external light source. This also applies to the above-described or later-described embodiments and modifications thereof.

As described above with reference to FIG. 7, on the basis of a transmittance of light having an incident angle of 0°, i.e., on the basis of a transmittance of light incident in the first incident direction ID1 which is a direction approximately perpendicular to the second substrate S2, within a certain section, the transmittance decreases as the incident angle increases. Also, the degree to which the transmittance decreases and the angle at which the minimum transmittance appears vary according to a potential difference between the first electrode E1 and the second electrode E2.

Referring to FIG. 7, as the potential difference between the first electrode E1 and the second electrode E2 increases, the angle at which the minimum transmittance appears decreases. Therefore, glare caused by sunlight in a room may be minimized at any time by adjusting the potential difference between the first electrode E1 and the second electrode E2 according to the location of a strong light source such as the sun located outdoors. For example, since the altitude of the sun becomes high during the morning until midday, the potential difference between the first electrode E1 and the second electrode E2 may be gradually decreased over time. Since the altitude of the sun becomes lower over time in the afternoon, the potential difference between the first electrode E1 and the second electrode E2 may also be gradually increased over time.

The sensing unit SS is the incident angle sensing unit that recognizes an incident angle of sunlight. Therefore, a controller (not shown) which receives information about an incident angle of sunlight recognized by the sensing unit SS may generate a signal for adjusting the potential difference between the first electrode E1 and the second electrode E2 of the smart window SW and transmit the signal to the smart window SW to thereby always minimize glare from the sunlight indoors.

FIG. 17 illustrates that the sliding smart window includes the incident angle sensing unit SS, but the present disclosure is not limited thereto. For example, a smart window device including a smart window according to any one of the above-described embodiments and an incident angle sensing unit recognizing an incident angle of sunlight may also pertain to the scope of the present disclosure. In a case of such a smart window device, using information about an incident angle of sunlight recognized by an incident angle sensing unit, a controller may generate a potential difference control signal for minimizing a first inclined transmittance in a transmittance according to the incident angle and adjust a potential difference V applied between a first electrode and a second electrode of a smart window according to the potential difference control signal.

Figure 18:
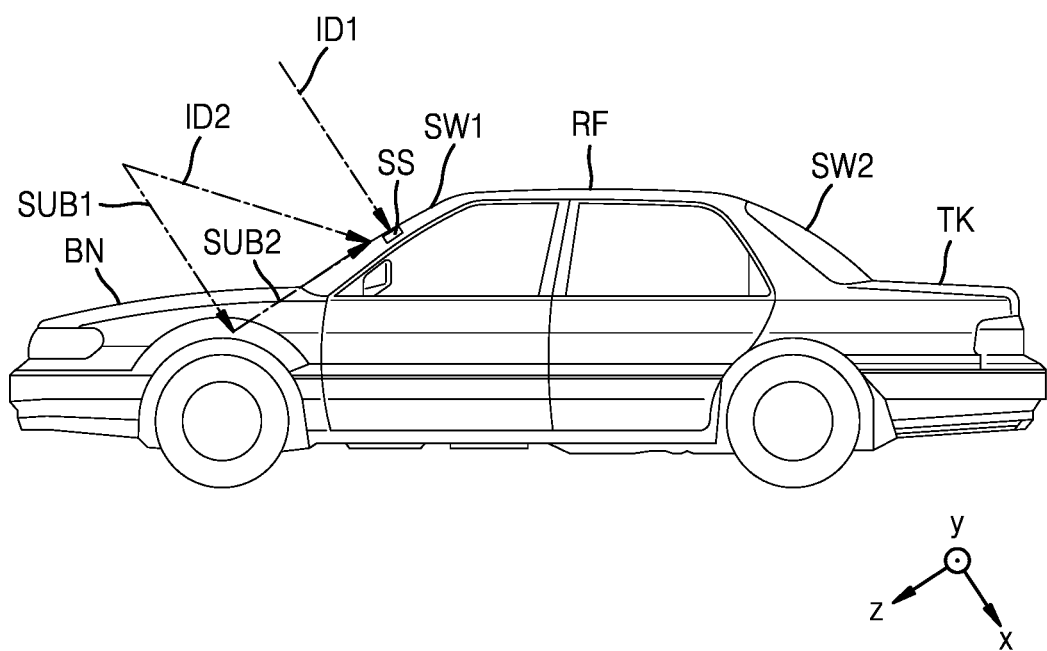
FIG. 18 is a side view schematically illustrating a vehicle including a smart window for a vehicle, according to another embodiment of the present disclosure.
Figure 19:
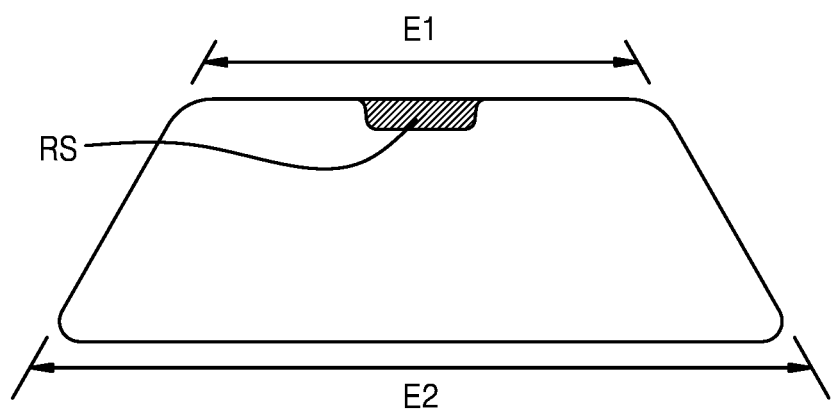
FIG. 19 is a front view schematically illustrating the smart window for a vehicle of FIG. 18.

FIG. 18 is a side view schematically illustrating a vehicle including a smart window for a vehicle according to another embodiment of the present disclosure. A windshield of a vehicle illustrated in FIG. 18, i.e., a front windshield SW1, may be a smart window for a vehicle according to the present embodiment. FIG. 19 is a front view schematically illustrating such a front windshield SW1. In other words, it may be understood that FIG. 19 illustrates a front windshield SW1 of a vehicle as viewed from the outside of the vehicle.

A such a smart window for a vehicle may include a smart window SW according to any one of the above-described embodiments. Here, a front windshield SW1 has a shape in which the length of an edge E1 adjacent to a roof RF is shorter than the length of an edge E2 adjacent to a bonnet BN.

The smart window SW described above with reference to FIGS. 1 through 16 lowers a transmittance of light which proceeds obliquely downwards from a light source located above the first incident direction ID1 which is the direction (the −x direction) perpendicular to the outer surface of the second substrate S2 of the smart window SW, i.e., a transmittance of light incident in the second incident direction ID2. However, in the case of the smart window for a vehicle according to the present embodiment, an incident direction to the front windshield SW1 from a light source located below the first incident direction ID1 which is the direction (the −x direction) perpendicular to the outer surface of the second substrate S2 which is the outer surface of the front windshield SW1 becomes the second incident direction ID2. In other words, the smart window for a vehicle according to the present embodiment has a shape in which the smart window SW described above with reference to FIGS. 1 through 16 is rotated 180° around the first incident direction ID1.

In the case of a vehicle, a situation in which the driver's external visibility is deteriorated is a situation in which a bright light source such as the sun is located in the front view direction of the driver, such as immediately after sunrise or just before sunset. The driver's front view direction in such a situation is a downward direction from the first incident direction ID1 not the first incident direction ID1 perpendicular to the surface of the front windshield SW1. Therefore, the external visibility of the driver may be increased by making the second incident direction ID2 in the above-described embodiments lower than the first incident direction ID1.

As described above, the second incident direction ID2 may be expressed as a sum of a first-sub direction SUB1 perpendicular to the second substrate S2 (i.e., parallel to a x axis) and a second sub-direction SUB2 parallel to the second substrate S2 (i.e., parallel to a z axis). Therefore, the length of a first edge of the smart window SW according to the above-described embodiments in the second-sub direction may be shorter than the length of a second edge in a direction opposite to the second-sub direction such that the first edge is adjacent to the roof RF of the vehicle and the second edge is adjacent to the bonnet BN of the vehicle. In this case, the second substrate S2 may remain in the outdoor direction and the first substrate S1 may remain in the indoor direction. Since a rain sensor RS or the like is located at a portion of the front windshield SW1 adjacent to the roof RF, the first edge of the smart window SW in the second sub-direction according to the above-described embodiments may be an edge adjacent to the rain sensor RS when implementing the front windshield SW1.

A smart window for a vehicle may further include a sensing unit SS. The sensing unit SS is an incident angle sensing unit that recognizes an incident angle of sunlight. As described above with reference to FIG. 7, the degree to which the transmittance decreases and the angle at which the minimum transmittance appears vary according to the potential difference between the first electrode E1 and the second electrode E2. Therefore, a controller (not shown) which receives information about an incident angle of sunlight recognized by the sensing unit SS may generate a signal for adjusting the potential difference between the first electrode E1 and the second electrode E2 of the front windshield SW1 which is a smart window for a vehicle and transmit the signal to the front windshield SW1 to thereby always minimize glare caused by sunlight inside the vehicle.

For example, referring to FIG. 7, as the potential difference between the first electrode E1 and the second electrode E2 increases, the angle at which the minimum transmittance appears decreases. FIG. 7 illustrates that, on the basis of the transmittance of light having an incident angle of 0°, i.e., on the basis of the transmittance of light incident approximately perpendicular to the second substrate S2, within a certain section, the transmittance decreases as the incident angle increases. Even when FIG. 7 is applied to the front windshield SW1, a transmittance of light incident perpendicular to the front windshield SW1 is a transmittance when an incident angle is 0°. Also, a case in which the incident angle is a positive number indicates a transmittance when light from a light source located lower than a direction perpendicular to the front windshield SW1 enters the front windshield SW1.

In FIG. 7, as the potential difference between the first electrode E1 and the second electrode E2 increases, the angle at which the minimum transmittance appears decreases. Therefore, glare caused by sunlight inside the vehicle may be always minimized by adjusting the potential difference between the first electrode E1 and the second electrode E2 according to the location of a strong light source such as the sun located outdoors. For example, since the altitude of the sun becomes higher over time after sunrise, light from the sun is incident perpendicularly to the surface of the front windshield SW1 at some point. Accordingly, after sunrise, an incident angle at which the minimum transmittance appears may be reduced until the point. In other words, after sunrise, the potential difference between the first electrode E1 and the second electrode E2 may be gradually increased over time until the point. Since the altitude of the sun becomes lower over time in the afternoon, the potential difference between the first electrode E1 and the second electrode E2 may also be gradually decreased over time.

The incident angle sensing unit SS may sense that an incident angle of sunlight changes according to the inclination of the ground on which a vehicle moves. In other words, it may be understood that the incident angle sensing unit SS senses the degree of change in the incident angle of sunlight around a direction perpendicular to the front windshield SW1.

The incident angle sensing unit SS may be mounted in a frame of a vehicle as illustrated in FIG. 18. Also, since the rain sensor RS or the like is located at the portion of the front windshield SW1 adjacent to the roof RF as illustrated in FIG. 19, the incident angle sensing unit SS may also be located overlapping the rain sensor RS or may be located in the vicinity thereof.

A smart window for a vehicle may be applied not only to a front windshield SW1 of a vehicle but also to a rear windshield SW2 of the vehicle. In this case, it may be understood that the second edge E2 may be located adjacent to a trunk TK. Also, a vehicle including a front windshield SW1 and/or a rear windshield SW2 as described above may also pertain to the scope of the present disclosure. In addition, a building including a smart window or a sliding smart window described above with reference to FIGS. 1 through 17 may also pertain to the scope of the present disclosure.

Figure 20:
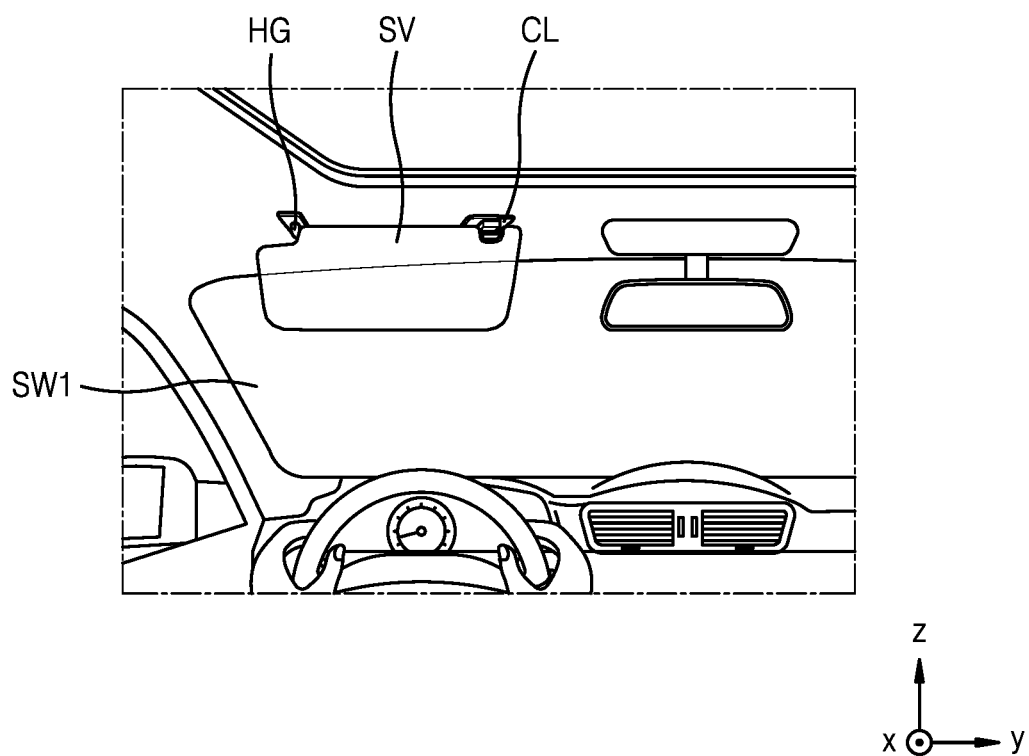
FIG. 20 is a rear view schematically illustrating a sun visor for a vehicle according to another embodiment of the present disclosure.

FIGS. 18 and 19 illustrate a front windshield SW1 and a rear windshield SW2 as a smart window for a vehicle, but the present disclosure is not limited thereto. For example, a sun visor for a vehicle having the same and/or similar configuration to the embodiments described above with reference to FIGS. 1 through 17 and a vehicle including the same may also pertain to the scope of the present disclosure. FIG. 20 is a rear view schematically illustrating a sun visor SV for a vehicle, and FIG. 21 is a side view schematically illustrating the sun visor SV for a vehicle of FIG. 20.

When the sun is located in front of a driver due to the lower altitude of the sun, a normal sun visor for a vehicle is used to block direct sunlight from the sun. However, the normal sun visor for a vehicle is made of an opaque material that blocks all light, not just direct sunlight from the sun and thus narrows the driver's front view. However, when the configuration of the embodiments described above with reference to FIGS. 1 through 17 is applied to a sun visor for a vehicle, the sun visor for a vehicle may shield a large portion of direct sunlight from the sun but may significantly lower a shielding rate for light incident at a different angle from that of direct sunlight than a shielding rate for direct sunlight, thereby solving the driver's front view limitation unlike a normal sun visor for a vehicle.

Figure 21:
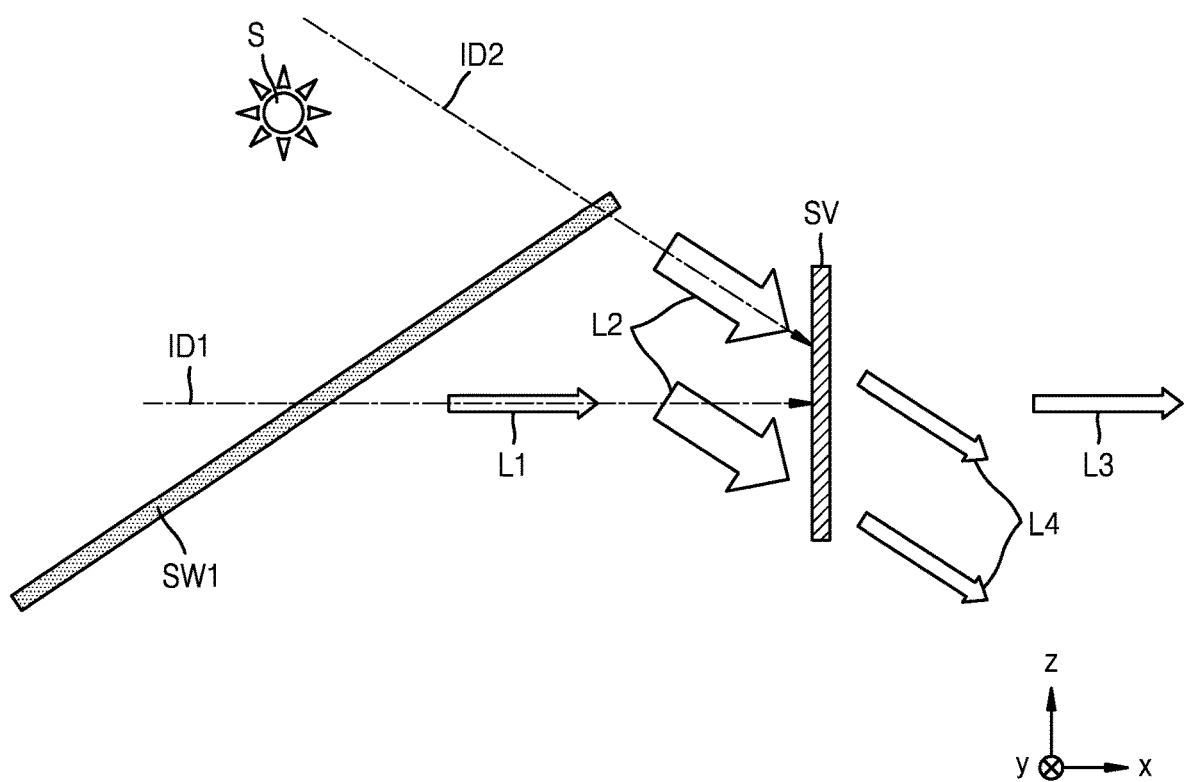
FIG. 21 is a side view schematically illustrating the sun visor for a vehicle of FIG. 20.

For example, the sun visor SV according to the present embodiment as illustrated in FIG. 21 may be in a first state or a second state as described above with reference to FIGS. 1 and 2. As illustrated in FIG. 21, in a case of the sun visor SV in the second state, a ratio of transmitted light L3 to light L1 incident in a first incident direction ID1 is maintained approximately similar to a ratio of transmitted light LD to light L1 incident in the first incident direction ID1 when in the first state. However, in the case of the sun visor SV in the second state, a ratio of transmitted light L4 to light L2 incident in a second incident direction ID2 is sharply reduced than a ratio of transmitted light L4 to light L2 incident in the second incident direction ID2 when in the first state. Accordingly, even when a bright light source such as the sun S exists outdoors, a person located inside a vehicle does not experience glare from such a light source. As the light L1 which may be referred to as ambient light in a direction in which such a light source does not exist is incident in the first incident direction ID1 not in the second incident direction ID2, a person located inside a vehicle may stably observe the outdoors without experiencing glare.

Therefore, the sun visor SV for a vehicle according to the present embodiment may maintain the first state when a bright light source such as the sun S does not exist in front of a driver and may maintain the second state when the bright light source such as the sun exists in front of the driver to thereby maintain external visibility to a certain level while preventing the driver or the like located inside a vehicle from experiencing glare.

As illustrated in FIG. 20, such a sun visor SV for a vehicle is fixed to a vehicle through a hinge HG located at an end of the sun visor SV and may be fixed to the vehicle to be pivotable on the hinge HG. A relative angle adjustment of the sun visor SV with respect to a front windshield SW1 may also be made through the hinge HG. Also, the other end of the sun visor SV may be fixed to the vehicle to be attachable to and/or detachable from the vehicle through a clip CL. An electrical signal to be applied to a first electrode E1 (refer to FIG. 5 or the like) or a second electrode E2 (refer to FIG. 5 or the like) of the sun visor SV may be transmitted to the first electrode E1 and the second electrode E1 through a wire passing through the inside of the hinge HG.

A front windshield SW1 as illustrated in FIGS. 20 and 21 may be a normal front windshield SW1 such glass, and, in some cases, may be a front windshield SW1 as described above with reference to FIGS. 18 and 19.

FIGS. 20 and 21 illustrate a sun visor SV is located on an yz plane, and functions of the sun visor SV have been described with reference to this, but the present disclosure is not limited thereto. For example, unlike being illustrated in FIG. 21, the sun visor SV may be located, by a user, in a state approximately parallel to the front windshield SW1. In this case, as the front windshield SW1 is described above with reference to FIG. 18, the second incident direction ID2 in which the transmittance is lowered in the second state becomes an incident direction from a light source located below the first incident direction ID1 which is a direction perpendicular to the outer surface of the sun visor SV.

Figure 22:
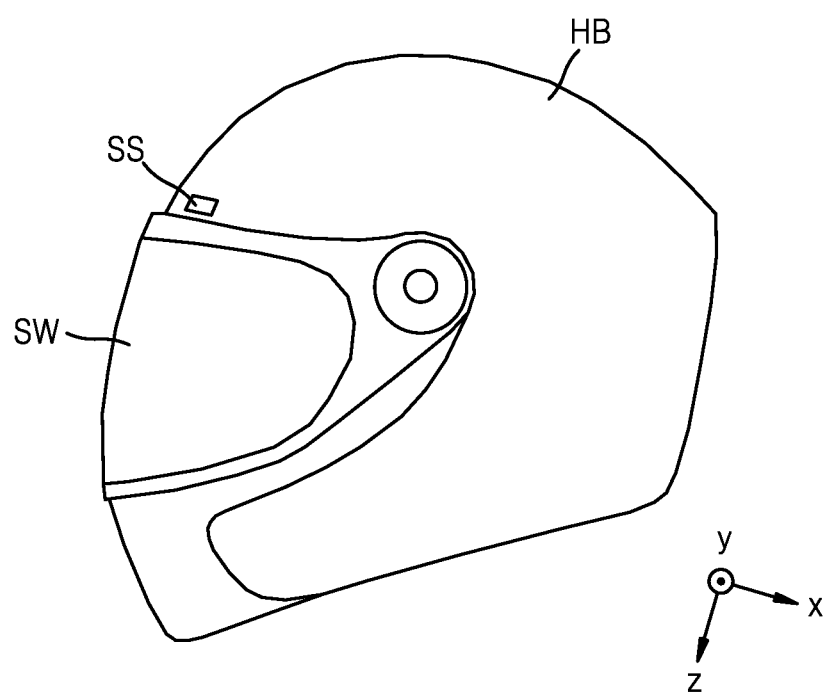
FIGS. 22 through 24 are views schematically illustrating head-mounted smart window devices according to other embodiments of the present disclosure.

FIG. 22 is a side view schematically illustrating a head-mounted smart window device according to another embodiment of the present disclosure. As illustrated in FIG. 22, a head-mounted smart window device according to the present embodiment may be in the form of a helmet including a smart window SW according to any one of various embodiments as described above and a mounting part connected to the smart window SW. FIG. 22 illustrates that the mounting part includes a helmet body HB. The head-mounted smart window device may operate in the same manner as the front windshield SW1 which is a smart window for a vehicle described above with reference to FIGS. 18 and 19. The head-mounted smart window device according to the present embodiment may also include an incident angle sensing unit SS as illustrated in FIG. 22.

Figure 23:
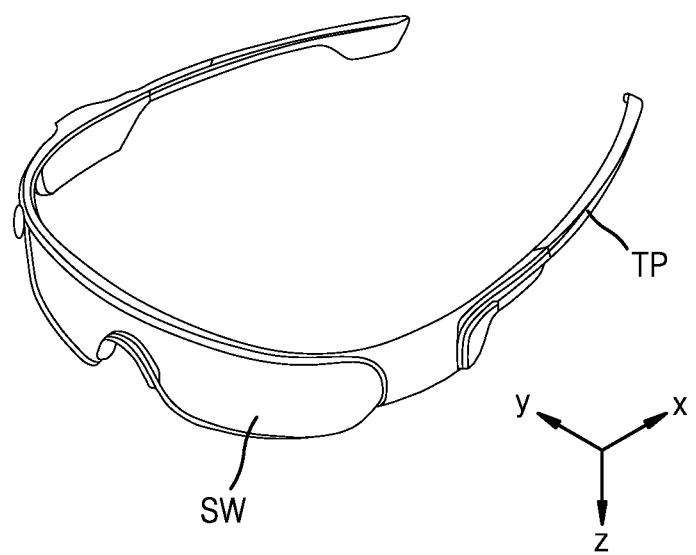
Figure 24:
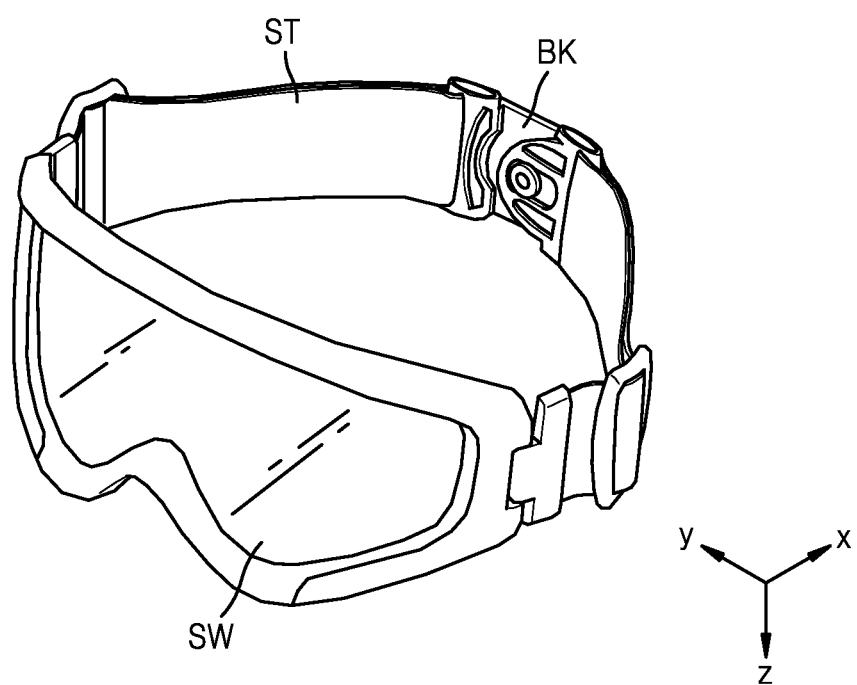

The scope of the present disclosure is not limited thereto. For example, as illustrated in FIGS. 23 and 24, the head-mounted smart window device may have a goggle shape rather than a helmet shape. FIG. 23 illustrates that a frame is connected to a smart window SW and a temple TP is connected to the frame, and FIG. 24 illustrates that, instead of the temple TP, a strip ST and a fastening buckle BK are connected to the frame.

While the present disclosure has been particularly shown and described with reference to embodiments shown in the drawings, this is only an example, and it will be understood by those skilled in the art that various modifications and equivalent other embodiments may be made therefrom. Therefore, the scope of the present disclosure should be defined by the spirit of the appended claims.

INDUSTRIAL APPLICABILITY

Embodiments of the present disclosure relate to a smart window, a sliding smart window, a smart window for a vehicle, a sun visor for a vehicle, a smart window device, and a head-mounted smart window which have maximized user convenience, and these devices may be used not only for vehicles but also for windows, sports goggles, industrial goggles, and the like.

The invention claimed is:

1. A smart window comprising:
a first substrate to be located in an indoor direction and a second substrate to be located in an outdoor direction, the first substrate and the second substrate being transparent and facing each other;
a first electrode which is transparent and a first alignment layer which is rubbed in a first direction, the first electrode and the first alignment layer being sequentially disposed over a surface of the first substrate facing the second substrate;
a second electrode which is transparent and a second alignment layer which is rubbed in a second direction different from the first direction, the second electrode and the second alignment layer being sequentially disposed over a surface of the second substrate facing the first substrate; and
a liquid crystal layer located between the first alignment layer and the second alignment layer,
wherein, when a potential difference applied between the first electrode and the second electrode is V, a transmittance of light incident from an outside into a room in a first incident direction perpendicular to the second substrate is referred to as a vertical transmittance, and a transmittance of light incident from the outside into the room in a second incident direction not perpendicular to the second substrate is referred to as a first inclined transmittance, the first inclined transmittance is less than the vertical transmittance when V is not 0, and a difference between the vertical transmittance and the first inclined transmittance when V is not 0 is greater than a difference between the vertical transmittance and the first inclined transmittance when V is 0, and wherein the smart window further comprises:
a first polarizing plate disposed over a surface of the first substrate facing away the second substrate; and
a second polarizing plate disposed over a surface of the second substrate facing away the first substrate,
wherein the liquid crystal layer operates in an electrically controlled birefringence (ECB) mode, the first direction and the second direction are parallel to a virtual straight line on which a virtual plane including the first incident direction and the second incident direction intersects with a surface of the second substrate in an outdoor direction, a transmission axis of the first polarizing plate is at an angle of 45° with the virtual straight line, and a transmission axis of the second polarizing plate is perpendicular to the transmission axis of the first polarizing plate.

2. The smart window of claim 1, wherein, when the second incident direction is expressed as a sum of a first sub-direction perpendicular to the second substrate and a second sub-direction parallel to the second substrate, the second direction coincides with the second sub-direction.

3. A smart window comprising:
a first substrate to be located in an indoor direction and a second substrate to be located in an outdoor direction, the first substrate and the second substrate being transparent and facing each other;
a first electrode which is transparent and a first alignment layer which is rubbed in a first direction, the first electrode and the first alignment layer being sequentially disposed over a surface of the first substrate facing the second substrate;
a second electrode which is transparent and a second alignment layer which is rubbed in a second direction different from the first direction, the second electrode and the second alignment layer being sequentially disposed over a surface of the second substrate facing the first substrate; and
a liquid crystal layer located between the first alignment layer and the second alignment layer,
wherein, when a potential difference applied between the first electrode and the second electrode is V, a transmittance of light incident from an outside into a room in a first incident direction perpendicular to the second substrate is referred to as a vertical transmittance, and a transmittance of light incident from the outside into the room in a second incident direction not perpendicular to the second substrate is referred to as a first inclined transmittance, the first inclined transmittance is less than the vertical transmittance when V is not 0, and a difference between the vertical transmittance and the first inclined transmittance when V is not 0 is greater than a difference between the vertical transmittance and the first inclined transmittance when V is 0, and
wherein the smart window further comprises:
a first polarizing plate disposed over a surface of the first substrate facing away the second substrate;
a second polarizing plate disposed over a surface of the second substrate facing away the first substrate; and
a phase difference plate disposed over the surface of the first substrate facing away the second substrate or on the surface of the second substrate facing away the first substrate,
wherein the liquid crystal layer operates in a vertical alignment (VA) mode, the first direction and the second direction are parallel to a virtual straight line on which a virtual plane including the first incident direction and the second incident direction intersects with a surface of the second substrate in an outdoor direction, a transmission axis of the first polarizing plate is at an angle of 45° with the virtual straight line, a transmission axis of the second polarizing plate is perpendicular to the transmission axis of the first polarizing plate, and a phase delay axis of the phase difference plate is parallel to the virtual straight line.

4. The smart window of claim 3, wherein, when the second incident direction is expressed as a sum of a first sub-direction perpendicular to the second substrate and a second sub-direction parallel to the second substrate, the second direction coincides with the second sub-direction.

5. A smart window comprising:
a first substrate to be located in an indoor direction and a second substrate to be located in an outdoor direction, the first substrate and the second substrate being transparent and facing each other;
a first electrode which is transparent and a first alignment layer which is rubbed in a first direction, the first electrode and the first alignment layer being sequentially disposed over a surface of the first substrate facing the second substrate;
a second electrode which is transparent and a second alignment layer which is rubbed in a second direction different from the first direction, the second electrode and the second alignment layer being sequentially disposed over a surface of the second substrate facing the first substrate; and
a liquid crystal layer located between the first alignment layer and the second alignment layer,
wherein, when a potential difference applied between the first electrode and the second electrode is V, a transmittance of light incident from an outside into a room in a first incident direction perpendicular to the second substrate is referred to as a vertical transmittance, and a transmittance of light incident from the outside into the room in a second incident direction not perpendicular to the second substrate is referred to as a first inclined transmittance, the first inclined transmittance is less than the vertical transmittance when V is not 0, and a difference between the vertical transmittance and the first inclined transmittance when V is not 0 is greater than a difference between the vertical transmittance and the first inclined transmittance when V is 0, and
wherein the smart window further comprises:
a first polarizing plate disposed over a surface of the first substrate facing away the second substrate;
a second polarizing plate disposed over a surface of the second substrate facing away the first substrate; and
a phase difference plate disposed over the surface of the first substrate facing away the second substrate or on the surface of the second substrate facing away the first substrate,
wherein the liquid crystal layer operates in a vertical alignment (VA) mode, the first direction and the second direction are parallel to a virtual straight line on which a virtual plane including the first incident direction and the second incident direction intersects with a surface of the second substrate in an outdoor direction, a transmission axis of the first polarizing plate is at an angle of 45° with the virtual straight line, a transmission axis of the second polarizing plate is perpendicular to the transmission axis of the first polarizing plate, and a phase delay axis of the phase difference plate is perpendicular to the virtual straight line.

6. The smart window of claim 5, wherein when the second incident direction is expressed as a sum of a first sub-direction perpendicular to the second substrate and a second sub-direction parallel to the second substrate, the second direction coincides with a direction opposite to the second-sub direction.

7. A smart window comprising:
a first substrate to be located in an indoor direction and a second substrate to be located in an outdoor direction, the first substrate and the second substrate being transparent and facing each other;
a first electrode which is transparent and a first alignment layer which is rubbed in a first direction, the first electrode and the first alignment layer being sequentially disposed over a surface of the first substrate facing the second substrate;
a second electrode which is transparent and a second alignment layer which is rubbed in a second direction different from the first direction, the second electrode and the second alignment layer being sequentially disposed over a surface of the second substrate facing the first substrate; and
a liquid crystal layer located between the first alignment layer and the second alignment layer,
wherein, when a potential difference applied between the first electrode and the second electrode is V, a transmittance of light incident from an outside into a room in a first incident direction perpendicular to the second substrate is referred to as a vertical transmittance, and a transmittance of light incident from the outside into the room in a second incident direction not perpendicular to the second substrate is referred to as a first inclined transmittance, the first inclined transmittance is less than the vertical transmittance when V is not 0, and a difference between the vertical transmittance and the first inclined transmittance when V is not 0 is greater than a difference between the vertical transmittance and the first inclined transmittance when V is 0, and
wherein the smart window further comprises:
a first polarizing plate disposed over a surface of the first substrate facing away the second substrate; and
a second polarizing plate disposed over a surface of the second substrate facing away the first substrate,
wherein, the liquid crystal layer operates in a twisted nematic (TN) mode, the first direction is parallel to a surface of the second substrate in an outdoor direction, and is at an angle of 45° with a virtual straight line on which a virtual plane including the first incident direction and the second incident direction intersects with the surface of the second substrate in the outdoor direction, and when the first direction is expressed as a sum of a first auxiliary direction parallel to the virtual straight line and a second auxiliary direction perpendicular to the virtual straight line, and the second incident direction is expressed as a sum of a first sub-direction perpendicular to the second substrate and a second sub-direction parallel to the second substrate, the first auxiliary direction is opposite to the second sub-direction, the second auxiliary direction is a direction rotated clockwise from the first auxiliary direction when looking at the second substrate from the first substrate, and the second direction is a direction rotated 90° clockwise from the first direction when looking at the second substrate from the first substrate, and
wherein a transmission axis of the first polarizing plate is parallel to the first direction, and a transmission axis of the second polarizing plate is parallel to the second direction.

8. A smart window device comprising:
a smart window of claim 2; and
an incident angle sensing unit recognizing an incident angle of sunlight,
wherein an angle between the first incident direction and the second incident direction is adjusted by adjusting a potential difference V applied between the first electrode and the second electrode according to an incident angle of sunlight recognized by the incident angle sensing unit, such that the first inclined transmittance is minimized in a transmittance according to an incident angle.

9. A sliding smart window comprising:
a smart window of claim 2;
a frame surrounding an edge of the smart window; and
rollers arranged on an outer side of the frame in the second sub-direction.

10. A smart window for a vehicle comprising a smart window of clam 2, wherein a length of a first edge in the second sub-direction is shorter than a length of a second edge in a direction opposite to the second sub-direction.

11. The smart window for the vehicle of claim 10, wherein the first edge is located adjacent to a roof, and the second edge is located adjacent to a bonnet or a trunk.

12. A sun visor for a vehicle comprising a smart window of claim 2.

13. A head-mounted smart window device comprising:
a smart window of claim 2; and
a mounting part connected to the smart window.

14. The head-mounted smart window device of claim 13, wherein the mounting part comprises:
a frame connected to the smart window; and
a fastening buckle connected to the frame or a temple connected to the frame.

15. The head-mounted smart window device of claim 13, wherein the mounting part includes a helmet body.

* * * * *